United States Patent
Xia et al.

(10) Patent No.: US 10,681,713 B2
(45) Date of Patent: Jun. 9, 2020

(54) DATA TRANSMISSION METHOD, AND APPARATUS

(71) Applicant: HUAWEI TECHNOLOGIES CO., LTD., Shenzhen, Guangdong (CN)

(72) Inventors: Jinhuan Xia, Beijing (CN); Junren Chang, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 56 days.

(21) Appl. No.: 16/028,392

(22) Filed: Jul. 5, 2018

(65) Prior Publication Data
US 2018/0317241 A1 Nov. 1, 2018

Related U.S. Application Data

(63) Continuation of application No. PCT/CN2016/070527, filed on Jan. 8, 2016.

(51) Int. Cl.
*H04W 72/12* (2009.01)
*H04W 72/04* (2009.01)

(52) U.S. Cl.
CPC ........... *H04W 72/12* (2013.01); *H04W 72/04* (2013.01); *H04W 72/042* (2013.01)

(58) Field of Classification Search
CPC .... H04W 72/12; H04W 72/04; H04W 72/042
(Continued)

(56) References Cited

U.S. PATENT DOCUMENTS

2012/0082077 A1 4/2012 Zhang et al.
2013/0229981 A1 9/2013 Park et al.
(Continued)

FOREIGN PATENT DOCUMENTS

CN 101005326 A 7/2007
CN 101114868 A 1/2008
(Continued)

OTHER PUBLICATIONS

NTT Docomo, Initial Views on Technical Design for NB-IoT. 3GPP TSG RAN WG1 Meeting #83 Anaheim, USA, Nov. 15-22, 2015, R1-157351, 3 pages.
(Continued)

*Primary Examiner* — Ricky Q Ngo
*Assistant Examiner* — Ellen A Kirillova
(74) *Attorney, Agent, or Firm* — Womble Bond Dickinson (US) LLP

(57) ABSTRACT

Embodiments of the present invention provide a data transmission method and an apparatus, and relate to the field of communications technologies. The method includes: obtaining, by a terminal, first indication information of an uplink resource used for sending uplink data or uplink control information. The first indication information of the uplink resource includes information used to indicate whether the uplink resource is a type 1 uplink resource or a type 2 uplink resource. The type 1 uplink resource includes at least one subcarrier in a frequency domain, where when a subcarrier quantity of subcarriers is greater than or equal to 2, the subcarriers are orthogonal to each other, and a subcarrier spacing is 3.75 kHz; or the type 1 uplink resource includes at least one sub-channel in a frequency domain, where a bandwith of each sub-channel is approximately 3.75 kHz.

17 Claims, 12 Drawing Sheets

(58) Field of Classification Search
USPC .......................................................... 370/329
See application file for complete search history.

(56) References Cited

U.S. PATENT DOCUMENTS

2017/0070994 A1    3/2017  Rico et al.
2017/0164350 A1*   6/2017  Sun ........................... H04L 5/00

FOREIGN PATENT DOCUMENTS

| CN | 101873205 A | 10/2010 |
| CN | 103222205 A | 7/2013 |
| CN | 103986566 A | 8/2014 |
| EP | 2618503 A2 | 7/2013 |
| JP | 2018-533257 A | 11/2018 |
| WO | 2014139156 A1 | 9/2014 |

OTHER PUBLICATIONS

3rd Generation Partnership Project;Technical Specification Group GSM/Edge Radio Access Network;Cellular system support for ultra-low complexity and low throughput Internet of Things(CIoT)(Release 13), 3GPP TR 45.820, V13 .1 .0, Dec. 18, 2015, pp. 1-495, XP051047128.

Qualcomm Incorporated:"Design Principles for NB-IoT Sync Channel", R1-157068, Nov. 15, 2015, XP051003362, 6 pages.

Huawei, HiSilicon, DCI for NB-IoT [online], 3GPP TSG-RAN WG1 #84 R1-160323, Feb. 6, 2016, 6 pages.

Ericsson et al, NB LTE—Concept Description L1. 3GPP TSG-RAN #69 Sep. 14-16, 2015 Phoenix, Arizona, USA, RP-151397, 24 pages.

Ericsson, Narrowband LTE—Random Access Design. 3GPP TSG-RAN1 #82bis Oct. 5-9, 2015 Malmö, Sweden, R1-156011, 11 pages.

LG Electronics, Discussion on Random Access Procedure for NB-IoT. 3GPP TSG RAN WG1 Meeting #83 Anaheim, California, USA, Nov. 15-22, 2015, R1-156885, 4 pages.

Qualcomm Incorporated, UL Design for NB-IOT. 3GPP TSG RAN WG1 #83 Nov. 15-22, 2015 Anaheim, USA, R1-157071, 6 pages.

"3GPP TS 36.201 V13.0.0, 3rd Generation Partnership Project;Technical Specification Group Radio Access Network; Evolved Universal Terrestrial Radio Access (E-UTRA);LTE physical layer; General description(Release 13), Dec. 2015, 14 pages".

"3GPP TS 36.211 V13.0.0, 3rd Generation Partnership Project;Technical Specification Group Radio Access Network; Evolved Universal Terrestrial Radio Access (E-UTRA);Physical channels and modulation(Release 13), Dec. 2015, 142 pages".

"3GPP TS 36.212 V13.0.0, 3rd Generation Partnership Project;Technical Specification Group Radio Access Network; Evolved Universal Terrestrial Radio Access (E-UTRA);Multiplexing and channel coding(Release 13), Dec. 2015, 121 pages".

"3GPP TS 36.213 V13.0.0, 3rd Generation Partnership Project;Technical Specification Group Radio Access Network; Evolved Universal Terrestrial Radio Access (E-UTRA);Physical layer procedures(Release 13), Dec. 2015, 326 pages".

"3GPP TS 36.331 V13.0.0, 3rd Generation Partnership Project;Technical Specification Group Radio Access Network; Evolved Universal Terrestrial Radio Access (E-UTRA);Radio Resource Control (RRC); Protocol specification(Release 13), Dec. 2015, 507 pages".

"3GPP TS 36.306 V13.0.0, 3rd Generation Partnership Project;Technical Specification Group Radio Access Network; Evolved Universal Terrestrial Radio Access (E-UTRA);User Equipment (UE) radio access capabilities(Release 13), Dec. 2015, 48 pages".

* cited by examiner

DATA TRANSMISSION METHOD, AND APPARATUS

CROSS-REFERENCE TO RELATED APPLICATIONS

This application is a continuation of International Application No. PCT/CN2016/070527, filed on Jan. 8, 2016, the disclosure of which is hereby incorporated by reference in its entirety.

TECHNICAL FIELD

The present invention relates to the field of communications technologies, and in particular, to a data transmission method and an apparatus.

BACKGROUND

Currently, in a Long Term Evolution (LTE) system, user equipment (UE) detects downlink control information (DCI) in a downlink subframe. The DCI includes scheduling information used by the UE to send a physical uplink shared channel (PUSCH) and scheduling information used by the UE to receive a physical downlink shared channel (PDSCH), for example, a quantity of physical resource blocks used in a frequency domain, a used modulation and coding scheme or modulation scheme, and a quantity of bits included in a carried transport block. The PUSCH channel mainly carries uplink data sent by a terminal, and is sent by means of single-carrier frequency division multiple access (SC-FDMA). A smallest scheduling granularity in the frequency domain is one physical resource block (PRB). One PRB includes 12 orthogonal subcarriers in the frequency domain, and a subcarrier spacing is 15 kHz. Therefore, one PRB includes a 180 kHz frequency resource.

However, with rapid development of communications technologies, an LTE terminal that can support a plurality of types of terminal capabilities has been available. For example, that a terminal supports a type 1 terminal capability means that a terminal can send a single subcarrier by means of SC-FDMA at an orthogonal subcarrier spacing of 3.75 kHz in uplink, or send a single sub-channel by means of FDMA at a sub-channel bandbandwith of 3.75 kHz in uplink; that a terminal supports a type 2 terminal capability means that a terminal can send a single subcarrier by means of SC-FDMA at an orthogonal subcarrier spacing of 15 kHz in uplink; or that a terminal supports a type 3 terminal capability means that a terminal can send a plurality of subcarriers by means of SC-FDMA at an orthogonal subcarrier spacing of 15 kHz in uplink. A terminal that supports all of the three types of terminal capabilities supports an orthogonal frequency division multiple access (OFDMA) technology in downlink, and a subcarrier spacing is 15 kHz. The terminal can support any one or more of the three types of terminal capabilities.

However, the smallest scheduling granularity of the LTE system is one PRB, that is, a 180 kHz frequency resource, scheduling of a single subcarrier or a plurality of subcarriers is not supported, and a radio frequency bandwith of the terminal that supports the type 1 terminal capability and the type 2 terminal capability ranges from 3.75 kHz to 180 kHz. Therefore, the LTE system cannot receive information on a synchronization channel or a broadcast channel in the existing LTE system, and cannot perform communication normally. In this case, a data transmission method and an apparatus are urgently required.

SUMMARY

To resolve a prior-art problem, embodiments of the present invention provide a data processing method and an apparatus.

According to a first aspect, a data transmission method is provided, where the method includes:

obtaining, by a terminal, first indication information of an uplink resource used for sending uplink data or uplink control information, where the first indication information of the uplink resource includes information used to indicate whether the uplink resource is a type 1 uplink resource or a type 2 uplink resource; the type 1 uplink resource includes at least one subcarrier in a frequency domain and at least one SC-FDMA symbol in a time domain, where when a subcarrier quantity is greater than or equal to 2, subcarriers are orthogonal to each other, and a subcarrier spacing is approximately 3.75 kHz; or the type 1 uplink resource includes at least one sub-channel in a frequency domain and at least one frequency division multiple access (FDMA) symbol in a time domain, where a bandwith of each sub-channel is approximately 3.75 kHz; and the type 2 uplink resource includes at least one subcarrier in the frequency domain and at least one SC-FDMA symbol in the time domain, where when a subcarrier quantity is greater than or equal to 2, subcarriers are orthogonal to each other, and a subcarrier spacing is 15 kHz; and the first indication information of the uplink resource further includes time-domain information and/or frequency-domain information of the type 1 uplink resource or the type 2 uplink resource.

In one embodiment, the obtaining, by a terminal, first indication information of an uplink resource used for sending uplink data or uplink control information includes:

receiving, by the terminal, system information sent by a base station, where the system information includes the time-domain information and/or the frequency-domain information of the type 1 uplink resource, and/or the time-domain information and/or the frequency-domain information of the type 2 uplink resource.

In one embodiment, if the terminal supports a type 1 terminal capability, the first indication information is used to indicate that the uplink resource is the type 1 uplink resource;

if the terminal supports a type 2 terminal capability or a type 3 terminal capability, the first indication information is used to indicate that the uplink resource is the type 2 uplink resource; or if the terminal supports a type 1 terminal capability and a type 2 terminal capability, or the terminal supports a type 1 terminal capability and a type 3 terminal capability, the first indication information is used to indicate that the uplink resource is the type 1 uplink resource or the type 2 uplink resource.

In one embodiment, after the obtaining, by a terminal, first indication information, the method further includes:

if the terminal supports the type 1 terminal capability, sending, by the terminal, the uplink data or the uplink control information on the type 1 uplink resource;

if the terminal supports the type 2 terminal capability or the type 3 terminal capability, sending, by the terminal, the uplink data or the uplink control information on the type 2 uplink resource; or if the terminal supports the type 1 terminal capability and the type 2 terminal capability, or the terminal supports the type 1 terminal capability and the type 3 terminal capability, sending, by the terminal, the uplink data or the uplink control information on the type 1 uplink resource or the type 2 uplink resource.

In one embodiment, the method further includes:

obtaining, by the terminal, second indication information of the uplink resource used for sending the uplink data, where the second indication information includes subcarrier information or sub-channel information of the type 1 uplink resource or the type 2 uplink resource used for sending the uplink data by the terminal;

the subcarrier information includes at least one of the following: a subcarrier quantity, a subcarrier index, or information used to indicate a location or an index of a subcarrier in the frequency domain; and the sub-channel information includes at least one of the following: a sub-channel quantity, a sub-channel index, or information used to indicate a location or an index of a sub-channel in the frequency domain.

In one embodiment, the obtaining, by the terminal, second indication information of the uplink resource used for sending the uplink data includes:

receiving, by the terminal, downlink control information DCI or a random access response RAR sent by the base station, where the DCI or the RAR includes the second indication information.

In one embodiment, when the DCI or the RAR further includes scheduling information used to schedule the terminal to send the uplink data, after the receiving, by the terminal, DCI or an RAR sent by the base station, the method further includes:

if the terminal supports the type 1 terminal capability, sending, by the terminal, the uplink data on the type 1 uplink resource;

if the terminal supports the type 2 terminal capability or the type 3 terminal capability, sending, by the terminal, the uplink data on the type 2 uplink resource; or if the terminal supports the type 1 terminal capability and the type 2 terminal capability, or the terminal supports the type 1 terminal capability and the type 3 terminal capability, sending, by the terminal, the uplink data on the type 1 uplink resource or the type 2 uplink resource.

In one embodiment, the sending, by the terminal, the uplink data on the type 1 uplink resource includes:

sending, by the terminal on the type 1 uplink resource according to a first timing relationship corresponding to the type 1 uplink resource, the uplink data scheduled by using the scheduling information, where the first timing relationship corresponding to the type 1 uplink resource is used to indicate a timing relationship between the scheduling information included in the DCI or the RAR and the uplink data scheduled by using the scheduling information.

In one embodiment, the method further includes:

after the terminal sends the uplink data scheduled by using the scheduling information, receiving, by the terminal on the type 1 downlink resource according to a second timing relationship corresponding to the type 1 uplink resource, response feedback information sent by the base station, where the second timing relationship corresponding to the type 1 uplink resource is used to indicate a timing relationship between the uplink data sent by the terminal and the response feedback information corresponding to the uplink data.

In one embodiment, the sending, by the terminal, the uplink data on the type 2 uplink resource includes:

sending, by the terminal on the type 2 uplink resource according to a first timing relationship corresponding to the type 2 uplink resource, the uplink data scheduled by using the scheduling information, where the first timing relationship corresponding to the type 2 uplink resource is used to indicate a timing relationship between the scheduling information included in the DCI or the RAR and the uplink data scheduled by using the scheduling information.

In one embodiment, the method further includes:

after the terminal sends the uplink data scheduled by using the scheduling information, receiving, by the terminal on the type 2 downlink resource according to a second timing relationship corresponding to the type 2 uplink resource, response feedback information sent by the base station, where the second timing relationship corresponding to the type 2 uplink resource is used to indicate a timing relationship between the uplink data sent by the terminal and the response feedback information corresponding to the uplink data.

In one embodiment, when the terminal supports the type 1 terminal capability, the receiving, by the terminal, DCI or an RAR sent by the base station includes: detecting, by the terminal, the DCI or the RAR on the type 1 downlink resource, where the DCI or the RAR further includes the scheduling information used to schedule the terminal to send the uplink data;

when the terminal supports the type 2 terminal capability and the type 3 terminal capability, the receiving, by the terminal, DCI or an RAR sent by the base station includes: detecting, by the terminal, the DCI or the RAR on the type 2 downlink resource, where the DCI or the RAR includes the scheduling information used to schedule the terminal to send the uplink data; or when the terminal supports the type 1 terminal capability and the type 2 terminal capability, or the terminal supports the type 1 terminal capability and the type 3 terminal capability, the receiving, by the terminal, DCI or an RAR sent by the base station includes: detecting, by the terminal, the DCI or the RAR on the type 1 downlink resource and/or the type 2 downlink resource, where the DCI or the RAR includes the scheduling information used to schedule the terminal to send the uplink data.

In one embodiment, when the terminal supports the type 1 terminal capability and the type 2 terminal capability, or the terminal supports the type 1 terminal capability and the type 3 terminal capability, the DCI or the RAR further includes third indication information used to indicate whether the uplink resource used for sending the uplink data by the terminal is the type 1 uplink resource or the type 2 uplink resource.

In one embodiment, if the received DCI is in a first DCI format, the third indication information indicates subcarrier information or sub-channel information of the type 1 uplink resource used for sending the uplink data by the terminal; or if the received DCI is in a second DCI format, the third indication information indicates subcarrier information or sub-channel information of the type 2 uplink resource used for sending the uplink data by the terminal; or if CRC in the DCI is scrambled by using a first scrambling code, the third indication information indicates subcarrier information or sub-channel information of the type 1 uplink resource used for sending the uplink data by the terminal; or if the CRC in the DCI is scrambled by using a second scrambling code, the third indication information indicates subcarrier information or sub-channel information of the type 2 uplink resource used for sending the uplink data by the terminal.

In one embodiment, before the receiving, by the terminal, DCI or an RAR sent by the base station, the method further includes:

sending, by the terminal, random access information on a physical random access channel (PRACH), where a bandwidth occupied by each PRACH channel in the frequency domain is 3.75 kHz or 15 kHz, or is greater than 15 kHz and less than or equal to 180 kHz, and the random access information is a random preamble, an orthogonal sequence code, or a modulation symbol.

In one embodiment, before the sending, by the terminal, random access information on a PRACH, the method further includes:

receiving, by the terminal, system information sent by the base station, where the system information includes configuration information of the PRACH channel, and the configuration information of the PRACH channel includes information about a type 1 PRACH channel and/or information about a type 2 PRACH channel;

a bandwidth occupied by each type 1 PRACH channel in the frequency domain is approximately 3.75 kHz or 15 kHz, and the information about the type 1 PRACH channel includes at least one of the following: a quantity of type 1 PRACH channels in the frequency domain, or index or location information of the type 1 PRACH channel in the frequency domain; and a bandwidth occupied by each type 2 PRACH channel in the frequency domain is greater than 15 kHz and less than or equal to 180 kHz, and the information about the type 2 PRACH channel includes at least one of the following: a quantity of type 2 PRACH channels in the frequency domain, or index or location information of the type 2 PRACH channel in the frequency domain.

In one embodiment, the terminal sends a randomly selected random preamble or orthogonal sequence code to the base station on a randomly selected PRACH channel at each random access information sending opportunity; or the terminal sends a random preamble or an orthogonal sequence code to the base station at n times, where the terminal occupies a PRACH channel at each random access information sending opportunity, to send a segment of the random preamble or the orthogonal sequence code, and n is an integer greater than or equal to 1.

In one embodiment, when the terminal supports the type 1 terminal capability and/or the type 2 terminal capability, the terminal sends the random access information to the base station on the type 1 PRACH channel; or when the terminal supports the type 1 terminal capability and/or the type 3 terminal capability, the terminal sends the random access information to the base station on the type 2 PRACH channel.

In one embodiment, when the terminal supports the type 1 terminal capability and/or the type 2 terminal capability, after the terminal sends the random access information to the base station on the type 1 PRACH channel, the method further includes:

receiving, by the terminal on a downlink resource corresponding to the type 1 PRACH channel and according to a timing relationship corresponding to the type 1 PRACH channel, the RAR sent by the base station, where the timing relationship corresponding to the type 1 PRACH channel is used to indicate a timing relationship between the random access information sent by the terminal and the RAR sent by the base station.

In one embodiment, when the terminal supports the type 1 terminal capability and/or the type 3 terminal capability, after the terminal sends the random access information to the base station on the type 2 PRACH channel, the method further includes:

receiving, by the terminal on a downlink resource corresponding to the type 2 PRACH channel and according to a timing relationship corresponding to the type 2 PRACH channel, the RAR sent by the base station, where the timing relationship corresponding to the type 2 PRACH channel is used to indicate a timing relationship between the random access information sent by the terminal and the RAR sent by the base station.

According to a second aspect, a data transmission method is provided, where the method includes:

sending, by a base station, system information to a terminal, where the system information includes first indication information used to indicate an uplink resource used for sending uplink data or uplink control information by the terminal;

the first indication information of the uplink resource includes information used to indicate whether the uplink resource is a type 1 uplink resource or a type 2 uplink resource; the type 1 uplink resource includes at least one subcarrier in a frequency domain and at least one SC-FDMA symbol in a time domain, where when a subcarrier quantity is greater than or equal to 2, subcarriers are orthogonal to each other, and a subcarrier spacing is approximately 3.75 kHz; or the type 1 uplink resource includes at least one sub-channel in a frequency domain and at least one FDMA symbol in a time domain, where a bandwith of each sub-channel is 3.75 kHz; and the type 2 uplink resource includes at least one subcarrier in the frequency domain and at least one SC-FDMA symbol in the time domain, where when a subcarrier quantity is greater than or equal to 2, subcarriers are orthogonal to each other, and a subcarrier spacing is approximately 15 kHz; and the first indication information of the uplink resource further includes time-domain information and/or frequency-domain information of the type 1 uplink resource or the type 2 uplink resource.

In one embodiment, if the terminal supports a type 1 terminal capability, the first indication information is used to indicate that the uplink resource is the type 1 uplink resource;

if the terminal supports a type 2 terminal capability or a type 3 terminal capability, the first indication information is used to indicate that the uplink resource is the type 2 uplink resource; or if the terminal supports a type 1 terminal capability and a type 2 terminal capability, or the terminal supports a type 1 terminal capability and a type 3 terminal capability, the first indication information is used to indicate that the uplink resource is the type 1 uplink resource or the type 2 uplink resource.

In one embodiment, the method further includes:

sending, by the base station, downlink control information DCI or a random access response RAR to the terminal, where the DCI or the RAR includes second indication information used to indicate the uplink resource used for sending the uplink data by the terminal;

the second indication information includes subcarrier information or sub-channel information of the type 1 uplink resource or the type 2 uplink resource used for sending the uplink data by the terminal;

the subcarrier information includes at least one of the following: a subcarrier quantity, a subcarrier index, or information used to indicate a location or an index of a subcarrier in the frequency domain; and the sub-channel information includes at least one of the following: a sub-channel quantity, a sub-channel index, or information used to indicate a location or an index of a sub-channel in the frequency domain.

In one embodiment, the DCI or the RAR further includes scheduling information used to schedule the terminal to send the uplink data, and after the sending, by the base station, DCI or an RAR to the terminal, the method further includes:

receiving, on the type 1 uplink resource, the uplink data sent on the type 1 uplink resource by the terminal that supports the type 1 terminal capability; or receiving, on the type 2 uplink resource, the uplink data sent on the type 2 uplink resource by the terminal that supports the type 2 terminal capability or the type 3 terminal capability; or receiving, on the type 1 uplink resource, the uplink data sent on the type 1 uplink resource by the terminal that supports the type 1 terminal capability and the type 2 terminal capability; or receiving, on the type 2 uplink resource, the uplink data sent on the type 2 uplink resource by the terminal that supports the type 1 terminal capability and the type 2 terminal capability.

In one embodiment, the receiving, by the base station on the type 1 uplink resource, the uplink data sent on the type 1 uplink resource by the terminal includes:

receiving, by the base station on the type 1 uplink resource according to a first timing relationship corresponding to the type 1 uplink resource, the uplink data that is scheduled by using the scheduling information and that is sent by the terminal, where the first timing relationship corresponding to the type 1 uplink resource is used to indicate a timing relationship between the scheduling information included in the DCI or the RAR and the uplink data scheduled by using the scheduling information.

In one embodiment, after the base station receives, on the type 1 uplink resource, the uplink data that is scheduled by using the scheduling information and that is sent by the terminal, sending, by the base station on the type 1 downlink resource according to a second timing relationship corresponding to the type 1 uplink resource, response feedback information to the terminal, where the second timing relationship corresponding to the type 1 uplink resource is used to indicate a timing relationship between the uplink data sent by the terminal and the response feedback information corresponding to the uplink data.

In one embodiment, the receiving, by the base station on the type 2 uplink resource, the uplink data sent on the type 2 uplink resource by the terminal includes:

receiving, by the base station on the type 2 uplink resource according to a first timing relationship corresponding to the type 2 uplink resource, the uplink data that is scheduled by using the scheduling information and that is sent by the terminal, where the first timing relationship corresponding to the type 2 uplink resource is used to indicate a timing relationship between the scheduling information included in the DCI or the RAR and the uplink data scheduled by using the scheduling information.

In one embodiment, the method further includes:

after the base station receives, on the type 2 uplink resource, the uplink data that is scheduled by using the scheduling information and that is sent by the terminal, sending, by the base station on the type 2 downlink resource according to a second timing relationship corresponding to the type 2 uplink resource, response feedback information to the terminal, where the second timing relationship corresponding to the type 2 uplink resource is used to indicate a timing relationship between the uplink data sent by the terminal and the response feedback information corresponding to the uplink data.

In one embodiment, when the terminal supports the type 1 terminal capability, the sending, by the base station, DCI or an RAR to the terminal includes: sending, by the base station, the DCI or the RAR on the type 1 downlink resource, where the DCI or the RAR further includes the scheduling information used to schedule the terminal to send the uplink data;

when the terminal supports the type 2 terminal capability and the type 3 terminal capability, the sending, by the base station, DCI or an RAR to the terminal includes: sending, by the base station, the DCI or the RAR on the type 2 downlink resource, where the DCI or the RAR includes the scheduling information used to schedule the terminal to send the uplink data; or when the terminal supports the type 1 terminal capability and the type 2 terminal capability, or the terminal supports the type 1 terminal capability and the type 3 terminal capability, the sending, by the base station, DCI or an RAR to the terminal includes: sending, by the base station, the DCI or the RAR on the type 1 downlink resource and/or the type 2 downlink resource, where the DCI or the RAR includes the scheduling information used to schedule the terminal to send the uplink data.

In one embodiment, when the DCI or the RAR includes the second indication information, and the terminal supports the type 1 terminal capability and the type 2 terminal capability or the terminal supports the type 1 terminal capability and the type 3 terminal capability, the DCI or the RAR further includes third indication information used to indicate whether the uplink resource used for sending the uplink data by the terminal is the type 1 uplink resource or the type 2 uplink resource.

In one embodiment, if the DCI is in a first DCI format, the third indication information indicates subcarrier information or sub-channel information of the type 1 uplink resource used for sending the uplink data by the terminal; or if the DCI is in a second DCI format, the third indication information indicates subcarrier information or sub-channel information of the type 2 uplink resource used for sending the uplink data by the terminal; or if CRC in the DCI is scrambled by using a first scrambling code, the third indication information indicates subcarrier information or sub-channel information of the type 1 uplink resource used for sending the uplink data by the terminal; or if the CRC in the DCI is scrambled by using a second scrambling code, the third indication information indicates subcarrier information or sub-channel information of the type 2 uplink resource used for sending the uplink data by the terminal.

In one embodiment, before the sending, by the base station, DCI or an RAR to the terminal, the method further includes:

receiving, by the base station, random access information sent on a PRACH by the terminal, where a bandwidth occupied by each PRACH channel in the frequency domain is 3.75 kHz or 15 kHz, or is greater than 15 kHz and less than or equal to 180 kHz, and the random access information is a random preamble, an orthogonal sequence code, or a modulation symbol.

In one embodiment, before the receiving, by the base station, random access information sent on a PRACH by the terminal, the method further includes:

sending, by the base station, system information to the terminal, where the system information includes configuration information of the PRACH channel, and the configuration information of the PRACH channel includes information about a type 1 PRACH channel and/or information about a type 2 PRACH channel;

a bandwidth occupied by each type 1 PRACH channel in the frequency domain is 3.75 kHz or 15 kHz, and the information about the type 1 PRACH channel includes at least one of the following: a quantity of type 1 PRACH channels in the frequency domain, or index or location information of the type 1 PRACH channel in the frequency domain; and a bandwidth occupied by each type 2 PRACH channel in the frequency domain is greater than 15 kHz and less than or equal to 180 kHz, and the information about the type 2 PRACH channel includes at least one of the following: a quantity of type 2 PRACH channels in the frequency domain, or index or location information of the type 2 PRACH channel in the frequency domain.

In one embodiment, the receiving, by the base station, random access information sent on a PRACH by the terminal includes:

receiving, by the base station, a randomly selected random preamble or orthogonal sequence code sent by the terminal on a randomly selected PRACH channel at each random access information sending opportunity; or receiving, by the base station, a random preamble or an orthogonal sequence code sent by the terminal at n times, where the terminal occupies a PRACH channel at each random access information sending opportunity, to send a segment of the random preamble or the orthogonal sequence code, and n is an integer greater than or equal to 1.

In one embodiment, when the terminal supports the type 1 terminal capability and/or the type 2 terminal capability, the base station receives, on the type 1 PRACH channel, the random access information sent by the terminal; or when the terminal supports the type 3 terminal capability, the base station receives, on the type 2 PRACH channel, the random access information sent by the terminal.

In one embodiment, when the terminal supports the type 1 terminal capability and/or the type 2 terminal capability, after the base station receives, on the type 1 PRACH channel, the random access information sent by the terminal, the method further includes:

sending, by the base station on a downlink resource corresponding to the type 1 PRACH channel and according to a timing relationship corresponding to the type 1 PRACH channel, the RAR to the terminal, where the timing relationship corresponding to the type 1 PRACH channel is used to indicate a timing relationship between the random access information sent by the terminal and the RAR sent by the base station.

In one embodiment, when the terminal supports the type 3 terminal capability, after the base station receives, on the type 2 PRACH channel, the random access information sent by the terminal, the method further includes:

sending, by the base station on a downlink resource corresponding to the type 2 PRACH channel and according to a timing relationship corresponding to the type 2 PRACH channel, the RAR to the terminal, where the timing relationship corresponding to the type 2 PRACH channel is used to indicate a timing relationship between the random access information sent by the terminal and the RAR sent by the base station.

According to a third aspect, a terminal is provided, where the terminal includes:

an obtaining unit, configured to obtain first indication information of an uplink resource used for sending uplink data or uplink control information, where the first indication information of the uplink resource includes information used to indicate whether the uplink resource is a type 1 uplink resource or a type 2 uplink resource; the type 1 uplink resource includes at least one subcarrier in a frequency domain and at least one SC-FDMA symbol in a time domain, where when a subcarrier quantity is greater than or equal to 2, subcarriers are orthogonal to each other, and a subcarrier spacing is approximately 3.75 kHz; or the type 1 uplink resource includes at least one sub-channel in a frequency domain and at least one FDMA symbol in a time domain, where a bandwith of each sub-channel is approximately 3.75 kHz; and the type 2 uplink resource includes at least one subcarrier in the frequency domain and at least one SC-FDMA symbol in the time domain, where when a subcarrier quantity is greater than or equal to 2, subcarriers are orthogonal to each other, and a subcarrier spacing is approximately 15 kHz; and the first indication information of the uplink resource further includes time-domain information and/or frequency-domain information of the type 1 uplink resource or the type 2 uplink resource.

In one embodiment, the obtaining unit is configured to:

receive system information sent by a base station, where the system information includes the time-domain information and/or the frequency-domain information of the type 1 uplink resource, and/or the time-domain information and/or the frequency-domain information of the type 2 uplink resource.

In one embodiment, if the terminal supports a type 1 terminal capability, the first indication information is used to indicate that the uplink resource is the type 1 uplink resource;

if the terminal supports a type 2 terminal capability or a type 3 terminal capability, the first indication information is used to indicate that the uplink resource is the type 2 uplink resource; or if the terminal supports a type 1 terminal capability and a type 2 terminal capability, or the terminal supports a type 1 terminal capability and a type 3 terminal capability, the first indication information is used to indicate that the uplink resource is the type 1 uplink resource or the type 2 uplink resource.

In one embodiment, the terminal further includes:

a sending unit, configured to: if the terminal supports the type 1 terminal capability, send the uplink data or the uplink control information on the type 1 uplink resource;

if the terminal supports the type 2 terminal capability or the type 3 terminal capability, send the uplink data or the uplink control information on the type 2 uplink resource; or if the terminal supports the type 1 terminal capability and the type 2 terminal capability, or the terminal supports the type 1 terminal capability and the type 3 terminal capability, send the uplink data or the uplink control information on the type 1 uplink resource or the type 2 uplink resource.

In one embodiment, the obtaining unit is further configured to obtain second indication information of the uplink resource used for sending the uplink data, where the second indication information includes subcarrier information or sub-channel information of the type 1 uplink resource or the type 2 uplink resource used for sending the uplink data by the terminal;

the subcarrier information includes at least one of the following: a subcarrier quantity, a subcarrier index, or information used to indicate a location or an index of a subcarrier in the frequency domain; and the sub-channel information includes at least one of the following: a sub-channel quantity, a sub-channel index, or information used to indicate a location or an index of a sub-channel in the frequency domain.

In one embodiment, that the obtaining unit is configured to obtain second indication information of the uplink resource used for sending the uplink data includes:

receiving downlink control information DCI or a random access response RAR sent by the base station, where the DCI or the RAR includes the second indication information.

In one embodiment, the sending unit is further configured to:

if the terminal supports the type 1 terminal capability, send the uplink data on the type 1 uplink resource;

if the terminal supports the type 2 terminal capability or the type 3 terminal capability, send the uplink data on the type 2 uplink resource; or if the terminal supports the type 1 terminal capability and the type 2 terminal capability, or the terminal supports the type 1 terminal capability and the type 3 terminal capability, send the uplink data on the type 1 uplink resource or the type 2 uplink resource.

In one embodiment, that the sending unit is configured to send the uplink data on the type 1 uplink resource includes:

sending, on the type 1 uplink resource according to a first timing relationship corresponding to the type 1 uplink resource, the uplink data scheduled by using scheduling information, where the first timing relationship corresponding to the type 1 uplink resource is used to indicate a timing relationship between the scheduling information included in the DCI or the RAR and the uplink data scheduled by using the scheduling information.

In one embodiment, the obtaining unit is further configured to: after the sending unit sends the uplink data scheduled by using the scheduling information, receive, on the type 1 downlink resource according to a second timing relationship corresponding to the type 1 uplink resource, response feedback information sent by the base station, where the second timing relationship corresponding to the type 1 uplink resource is used to indicate a timing relationship between the uplink data sent by the terminal and the response feedback information corresponding to the uplink data.

In one embodiment, that the sending unit is configured to send the uplink data on the type 2 uplink resource includes:

sending, on the type 2 uplink resource according to a first timing relationship corresponding to the type 2 uplink resource, the uplink data scheduled by using scheduling information, where the first timing relationship corresponding to the type 2 uplink resource is used to indicate a timing relationship between the scheduling information included in the DCI or the RAR and the uplink data scheduled by using the scheduling information.

In one embodiment, the obtaining unit is further configured to: after the sending unit sends the uplink data scheduled by using the scheduling information, receive, on the type 2 downlink resource according to a second timing relationship corresponding to the type 2 uplink resource, response feedback information sent by the base station, where the second timing relationship corresponding to the type 2 uplink resource is used to indicate a timing relationship between the uplink data sent by the terminal and the response feedback information corresponding to the uplink data.

In one embodiment, that the obtaining unit is configured to receive DCI or an RAR sent by the base station includes:

when the terminal supports the type 1 terminal capability, detecting, by the obtaining unit, the DCI or the RAR on the type 1 downlink resource, where the DCI or the RAR further includes the scheduling information used to schedule the terminal to send the uplink data;

when the terminal supports the type 2 terminal capability and the type 3 terminal capability, detecting, by the obtaining unit, the DCI or the RAR on the type 2 downlink resource, where the DCI or the RAR includes the scheduling information used to schedule the terminal to send the uplink data; or when the terminal supports the type 1 terminal capability and the type 2 terminal capability, or the terminal supports the type 1 terminal capability and the type 3 terminal capability, detecting, by the obtaining unit, the DCI or the RAR on the type 1 downlink resource and/or the type 2 downlink resource, where the DCI or the RAR includes the scheduling information used to schedule the terminal to send the uplink data.

In one embodiment, when the terminal supports the type 1 terminal capability and the type 2 terminal capability, or the terminal supports the type 1 terminal capability and the type 3 terminal capability, the DCI or the RAR further includes third indication information used to indicate whether the uplink resource used for sending the uplink data by the terminal is the type 1 uplink resource or the type 2 uplink resource.

In one embodiment, if the received DCI is in a first DCI format, the third indication information indicates subcarrier information or sub-channel information of the type 1 uplink resource used for sending the uplink data by the terminal; or if the received DCI is in a second DCI format, the third indication information indicates subcarrier information or sub-channel information of the type 2 uplink resource used for sending the uplink data by the terminal; or if CRC in the DCI is scrambled by using a first scrambling code, the third indication information indicates subcarrier information or sub-channel information of the type 1 uplink resource used for sending the uplink data by the terminal; or if the CRC in the DCI is scrambled by using a second scrambling code, the third indication information indicates subcarrier information or sub-channel information of the type 2 uplink resource used for sending the uplink data by the terminal.

In one embodiment, the sending unit is further configured to send random access information on a PRACH, where a bandwidth occupied by each PRACH channel in the frequency domain is approximately 3.75 kHz or 15 kHz, or is greater than 15 kHz and less than or equal to 180 kHz, and the random access information is a random preamble, an orthogonal sequence code, or a modulation symbol.

In one embodiment, the obtaining unit is further configured to receive system information sent by the base station, where the system information includes configuration information of the PRACH channel, and the configuration information of the PRACH channel includes information about a type 1 PRACH channel and/or information about a type 2 PRACH channel;

a bandwidth occupied by each type 1 PRACH channel in the frequency domain is 3.75 kHz or 15 kHz, and the information about the type 1 PRACH channel includes at least one of the following: a quantity of type 1 PRACH channels in the frequency domain, or index or location information of the type 1 PRACH channel in the frequency domain; and a bandwidth occupied by each type 2 PRACH channel in the frequency domain is greater than 15 kHz and less than or equal to 180 kHz, and the information about the type 2 PRACH channel includes at least one of the following: a quantity of type 2 PRACH channels in the frequency domain, or index or location information of the type 2 PRACH channel in the frequency domain.

In one embodiment, that the sending unit is configured to send random access information on a PRACH includes:

sending a randomly selected random preamble or orthogonal sequence code to the base station on a randomly selected PRACH channel at each random access information sending opportunity; or sending a random preamble or an orthogonal sequence code to the base station at n times, where a PRACH channel is occupied at each random access information sending opportunity, to send a segment of the random preamble or the orthogonal sequence code, and n is an integer greater than or equal to 1.

In one embodiment, that the sending unit is configured to send random access information on a PRACH includes:

when the terminal supports the type 1 terminal capability and/or the type 2 terminal capability, sending the random access information to the base station on the type 1 PRACH channel; or when the terminal supports the type 1 terminal capability and/or the type 3 terminal capability, sending the random access information to the base station on the type 2 PRACH channel.

In one embodiment, when the terminal supports the type 1 terminal capability and/or the type 2 terminal capability, the obtaining unit is further configured to:

receive, on a downlink resource corresponding to the type 1 PRACH channel and according to a timing relationship corresponding to the type 1 PRACH channel, the RAR sent by the base station, where the timing relationship corresponding to the type 1 PRACH channel is used to indicate a timing relationship between the random access information sent by the terminal and the RAR sent by the base station.

In one embodiment, when the terminal supports the type 1 terminal capability and/or the type 3 terminal capability, the obtaining unit is further configured to:

receive, on a downlink resource corresponding to the type 2 PRACH channel and according to a timing relationship corresponding to the type 2 PRACH channel, the RAR sent by the base station, where the timing relationship corresponding to the type 2 PRACH channel is used to indicate a timing relationship between the random access information sent by the terminal and the RAR sent by the base station.

According to a fourth aspect, a base station is provided, where the base station includes:

a sending unit, configured to send system information to a terminal, where the system information includes first indication information used to indicate an uplink resource used for sending uplink data or uplink control information by the terminal;

the first indication information of the uplink resource includes information used to indicate whether the uplink resource is a type 1 uplink resource or a type 2 uplink resource; the type 1 uplink resource includes at least one subcarrier in a frequency domain and at least one SC-FDMA symbol in a time domain, where when a subcarrier quantity is greater than or equal to 2, subcarriers are orthogonal to each other, and a subcarrier spacing is 3.75 kHz; or the type 1 uplink resource includes at least one sub-channel in a frequency domain and at least one FDMA symbol in a time domain, where a bandwith of each sub-channel is 3.75 kHz; and the type 2 uplink resource includes at least one subcarrier in the frequency domain and at least one SC-FDMA symbol in the time domain, where when a subcarrier quantity is greater than or equal to 2, subcarriers are orthogonal to each other, and a subcarrier spacing is 15 kHz; and the first indication information of the uplink resource further includes time-domain information and/or frequency-domain information of the type 1 uplink resource or the type 2 uplink resource.

In one embodiment, if the terminal supports a type 1 terminal capability, the first indication information is used to indicate that the uplink resource is the type 1 uplink resource;

if the terminal supports a type 2 terminal capability or a type 3 terminal capability, the first indication information is used to indicate that the uplink resource is the type 2 uplink resource; or if the terminal supports a type 1 terminal capability and a type 2 terminal capability, or the terminal supports a type 1 terminal capability and a type 3 terminal capability, the first indication information is used to indicate that the uplink resource is the type 1 uplink resource or the type 2 uplink resource.

In one embodiment, the sending unit is further configured to send DCI or an RAR to the terminal, where the DCI or the RAR includes second indication information used to indicate the uplink resource used for sending the uplink data by the terminal;

the second indication information includes sub carrier information or sub-channel information of the type 1 uplink resource or the type 2 uplink resource used for sending the uplink data by the terminal;

the subcarrier information includes at least one of the following: a subcarrier quantity, a subcarrier index, or information used to indicate a location or an index of a subcarrier in the frequency domain; and the sub-channel information includes at least one of the following: a sub-channel quantity, a sub-channel index, or information used to indicate a location or an index of a sub-channel in the frequency domain.

In one embodiment, the base station further includes:

a receiving unit, configured to: receive, on the type 1 uplink resource, the uplink data sent on the type 1 uplink resource by the terminal that supports the type 1 terminal capability; or receive, on the type 2 uplink resource, the uplink data sent on the type 2 uplink resource by the terminal that supports the type 2 terminal capability or the type 3 terminal capability; or receive, on the type 1 uplink resource, the uplink data sent on the type 1 uplink resource by the terminal that supports the type 1 terminal capability and the type 2 terminal capability; or receive, on the type 2 uplink resource, the uplink data sent on the type 2 uplink resource by the terminal that supports the type 1 terminal capability and the type 2 terminal capability.

In one embodiment, that the receiving unit receives, on the type 1 uplink resource, the uplink data sent on the type 1 uplink resource by the terminal includes:

receiving, on the type 1 uplink resource according to a first timing relationship corresponding to the type 1 uplink resource, the uplink data that is scheduled by using scheduling information and that is sent by the terminal, where the first timing relationship corresponding to the type 1 uplink resource is used to indicate a timing relationship between the scheduling information included in the DCI or the RAR and the uplink data scheduled by using the scheduling information.

In one embodiment, the sending unit is further configured to: after the uplink data that is scheduled by using the scheduling information and that is sent by the terminal is received on the type 1 uplink resource, send, on the type 1 downlink resource according to a second timing relationship corresponding to the type 1 uplink resource, response feedback information to the terminal, where the second timing relationship corresponding to the type 1 uplink resource is used to indicate a timing relationship between the uplink data sent by the terminal and the response feedback information corresponding to the uplink data.

In one embodiment, that the receiving unit receives, on the type 2 uplink resource, the uplink data sent on the type 2 uplink resource by the terminal includes:

receiving, on the type 2 uplink resource according to a first timing relationship corresponding to the type 2 uplink resource, the uplink data that is scheduled by using scheduling information and that is sent by the terminal, where the first timing relationship corresponding to the type 2 uplink resource is used to indicate a timing relationship between the scheduling information included in the DCI or the RAR and the uplink data scheduled by using the scheduling information.

In one embodiment, the sending unit is further configured to: after the uplink data that is scheduled by using the scheduling information and that is sent by the terminal is received on the type 2 uplink resource, send, on the type 2 downlink resource according to a second timing relationship corresponding to the type 2 uplink resource, response feedback information to the terminal, where the second timing relationship corresponding to the type 2 uplink resource is used to indicate a timing relationship between the uplink data sent by the terminal and the response feedback information corresponding to the uplink data.

In one embodiment, that the sending unit is configured to send DCI or an RAR to the terminal includes:

when the terminal supports the type 1 terminal capability, sending the DCI or the RAR on the type 1 downlink resource, where the DCI or the RAR further includes the scheduling information used to schedule the terminal to send the uplink data;

when the terminal supports the type 2 terminal capability and the type 3 terminal capability, sending the DCI or the RAR on the type 2 downlink resource, where the DCI or the RAR includes the scheduling information used to schedule the terminal to send the uplink data; or when the terminal supports the type 1 terminal capability and the type 2 terminal capability, or the terminal supports the type 1 terminal capability and the type 3 terminal capability, sending the DCI or the RAR on the type 1 downlink resource and/or the type 2 downlink resource, where the DCI or the RAR includes the scheduling information used to schedule the terminal to send the uplink data.

In one embodiment, when the DCI or the RAR includes the second indication information, and the terminal supports the type 1 terminal capability and the type 2 terminal capability or the terminal supports the type 1 terminal capability and the type 3 terminal capability, the DCI or the RAR further includes third indication information used to indicate whether the uplink resource used for sending the uplink data by the terminal is the type 1 uplink resource or the type 2 uplink resource.

In one embodiment, if the DCI is in a first DCI format, the third indication information indicates subcarrier information or sub-channel information of the type 1 uplink resource used for sending the uplink data by the terminal; or if the DCI is in a second DCI format, the third indication information indicates subcarrier information or sub-channel information of the type 2 uplink resource used for sending the uplink data by the terminal; or if CRC in the DCI is scrambled by using a first scrambling code, the third indication information indicates subcarrier information or sub-channel information of the type 1 uplink resource used for sending the uplink data by the terminal; or if the CRC in the DCI is scrambled by using a second scrambling code, the third indication information indicates subcarrier information or sub-channel information of the type 2 uplink resource used for sending the uplink data by the terminal.

In one embodiment, the receiving unit is further configured to receive random access information sent on a PRACH by the terminal, where a bandwidth occupied by each PRACH channel in the frequency domain is 3.75 kHz or 15 kHz, or is greater than 15 kHz and less than or equal to 180 kHz, and the random access information is a random preamble, an orthogonal sequence code, or a modulation symbol.

In one embodiment, the sending unit is further configured to send system information to the terminal, where the system information includes configuration information of the PRACH channel, and the configuration information of the PRACH channel includes information about a type 1 PRACH channel and/or information about a type 2 PRACH channel;

a bandwidth occupied by each type 1 PRACH channel in the frequency domain is 3.75 kHz or 15 kHz, and the information about the type 1 PRACH channel includes at least one of the following: a quantity of type 1 PRACH channels in the frequency domain, or index or location information of the type 1 PRACH channel in the frequency domain; and a bandwidth occupied by each type 2 PRACH channel in the frequency domain is greater than 15 kHz and less than or equal to 180 kHz, and the information about the type 2 PRACH channel includes at least one of the following: a quantity of type 2 PRACH channels in the frequency domain, or index or location information of the type 2 PRACH channel in the frequency domain.

In one embodiment, that the receiving unit is configured to receive random access information sent on a PRACH by the terminal includes:

receiving a randomly selected random preamble or orthogonal sequence code sent by the terminal on a randomly selected PRACH channel at each random access information sending opportunity; or receiving a random preamble or an orthogonal sequence code sent by the terminal at n times, where the terminal occupies a PRACH channel at each random access information sending opportunity, to send a segment of the random preamble or the orthogonal sequence code, and n is an integer greater than or equal to 1.

In one embodiment, that the receiving unit is configured to receive random access information sent on a PRACH by the terminal includes:

when the terminal supports the type 1 terminal capability and/or the type 2 terminal capability, receiving, on the type 1 PRACH channel, the random access information sent by the terminal; or when the terminal supports the type 3 terminal capability, receiving, on the type 2 PRACH channel, the random access information sent by the terminal.

In one embodiment, that the sending unit is configured to receive, on the type 1 PRACH channel, the random access information sent by the terminal includes: sending, on a downlink resource corresponding to the type 1 PRACH channel and according to a timing relationship corresponding to the type 1 PRACH channel, the RAR to the terminal, where the timing relationship corresponding to the type 1 PRACH channel is used to indicate a timing relationship between the random access information sent by the terminal and the RAR sent by the base station.

In one embodiment, that the sending unit is configured to receive, on the type 2 PRACH channel, the random access information sent by the terminal includes: sending, on a downlink resource corresponding to the type 2 PRACH channel and according to a timing relationship corresponding to the type 2 PRACH channel, the RAR to the terminal, where the timing relationship corresponding to the type 2 PRACH channel is used to indicate a timing relationship between the random access information sent by the terminal and the RAR sent by the base station.

According to a fifth aspect, a terminal is provided, where the terminal includes a processor, a memory, a system bus, and a communications interface, where the memory is configured to store a computer executable instruction, the processor is connected to the memory by using the system bus, and when the base station runs, the processor executes the computer executable instruction stored in the memory, so that the terminal executes the data transmission method according to any one of the first aspect to the nineteenth possible implementation of the first aspect.

According to a sixth aspect, a base station is provided, where the base station includes a processor, a memory, a system bus, and a communications interface, where the memory is configured to store a computer executable instruction, the processor is connected to the memory by using the system bus, and when the base station runs, the processor executes the computer executable instruction stored in the memory, so that the base station executes the data transmission method according to any one of the second aspect to the sixteenth possible implementation of the second aspect.

According to the data transmission method and the apparatus provided in the embodiments of the present invention, the base station sends the system information to the terminal, where the system information includes the first indication information used to indicate the uplink resource used for sending the uplink data or the uplink control information by the terminal, and the first indication information includes the information used to indicate whether the uplink resource is the type 1 uplink resource or the type 2 uplink resource, and the time-domain information and/or the frequency-domain information of the type 1 uplink resource or the type 2 uplink resource; and then, the terminal obtains the first indication information of the uplink resource used for sending the uplink data or the uplink control information, and sends, based on the first indication information, uplink and downlink data sent and received on corresponding uplink and downlink resources. In this way, based on an existing LTE system, the base station can perform uplink and downlink data transmission with the terminal that supports any one, two, or three of the type 1 terminal capability, the type 2 terminal capability, or the type 3 terminal capability. This improves resource utilization of the LTE system and the base station.

DESCRIPTION OF EMBODIMENTS

Figure 1:
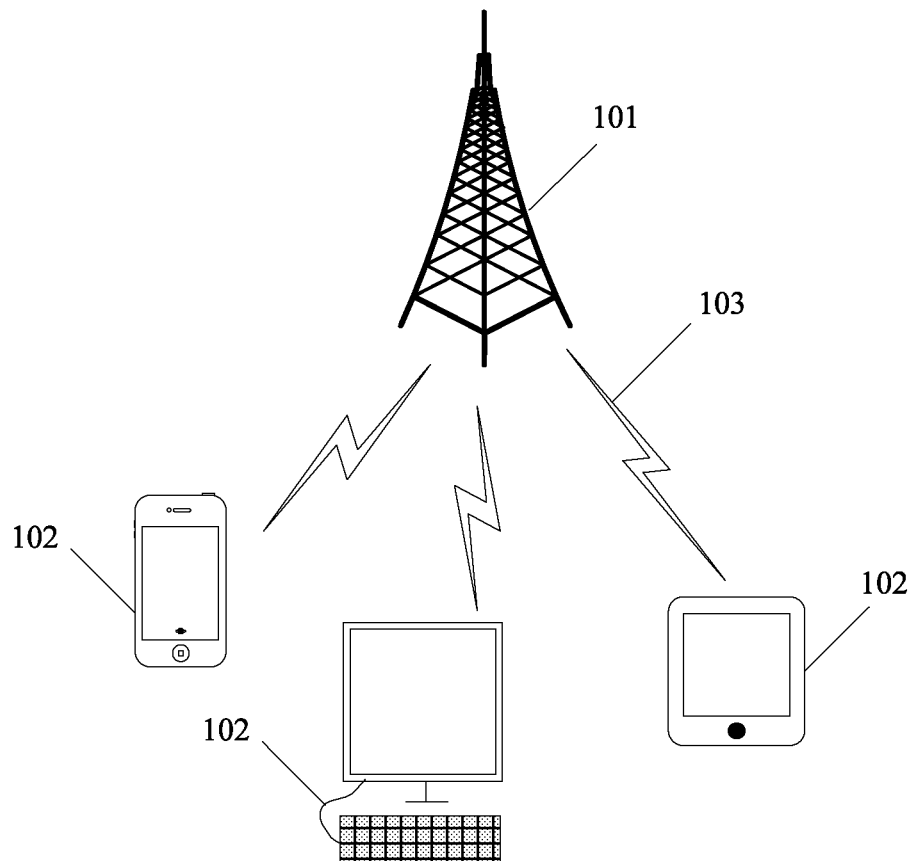
FIG. 1 is a system architecture diagram of a communications system according to an embodiment of the present invention.

Key concepts and terms used in the present invention and an application scenario are briefly described before the present invention is described.

The related key concepts and terms are as follows:

1. Three Types of Terminal Capabilities (Collectively Referred to as a New Terminal Capability):

The three types of terminal capabilities are defined according to an uplink orthogonal subcarrier spacing supported by a terminal and/or a quantity of subcarriers or sub-channels supported by the terminal. Details are as follows.

Type 1 terminal capability: allows to send a single subcarrier by means of SC-FDMA at an orthogonal subcarrier spacing of 3.75 kHz in uplink, or send a single sub-channel by means of FDMA at a sub-channel bandwith of 3.75 kHz in uplink.

Type 2 terminal capability: allows to send a single subcarrier by means of SC-FDMA at an orthogonal subcarrier spacing of 15 kHz in uplink.

Type 3 terminal capability: allows to send a plurality of subcarriers by means of SC-FDMA at an orthogonal subcarrier spacing of 15 kHz in uplink.

It should be noted that a user terminal in the embodiments of the present invention may be an existing LTE terminal, or may be a terminal having one or more of the foregoing types of terminal capabilities (hereinafter referred to as a new terminal). The existing LTE terminal can send orthogonal subcarriers by means of SC-FDMA at a subcarrier spacing of 15 kHz in uplink. A smallest scheduling granularity is one PRB that includes 12 orthogonal subcarriers, that is, 180 kHz. Scheduling of a single subcarrier or a plurality of subcarriers is not supported.

In addition, in the embodiments of the present invention, there is no necessary correspondence between a terminal capability and a terminal type. There may be a plurality of methods for distinguishing between terminal types according to terminal capabilities supported by terminals. For example, the foregoing three types of terminal capabilities may be corresponding to three different terminal types, that is, terminals that support one type of terminal capability are categorized as a terminal type. For another example, terminals that support both the type 1 terminal capability and the type 2 terminal capability are categorized as a terminal type, and terminals that support both the type 1 terminal capability and the type 3 terminal capability are categorized as another terminal type. Certainly, the foregoing is only used as an example for description. Specific categorization may be performed according to an actual case, and is not limited in the embodiments of the present invention.

In addition, the new terminal in the embodiments of the present invention is mainly applied to Internet of Things communication; therefore, a system that supports the new terminal may be referred to as a Narrowband Internet of Things (NBIOT) system.

2. Two Types of Uplink Resources and Two Types of Downlink Resources:

In the embodiments of the present invention, the two types of uplink resources include a type 1 uplink resource and a type 2 uplink resource, the two types of downlink resources include a type 1 downlink resource and a type 2 downlink resource. Details are as follows.

Type 1 uplink resource: The type 1 uplink resource includes at least one subcarrier in a frequency domain and at least one SC-FDMA symbol in a time domain, where when a subcarrier quantity is greater than or equal to 2, subcarriers are orthogonal to each other, and a subcarrier spacing is 3.75 kHz; or the type 1 uplink resource includes at least one sub-channel in a frequency domain and at least one FDMA symbol in a time domain, where a bandwith of each sub-channel is 3.75 kHz.

Type 2 uplink resource: The type 2 uplink resource includes at least one subcarrier in the frequency domain and at least one SC-FDMA symbol in the time domain, where when a subcarrier quantity is greater than or equal to 2, subcarriers are orthogonal to each other, and a subcarrier spacing is 15 kHz.

Type 1 downlink resource and type 2 downlink resource: The type 1 downlink resource is corresponding to the type 1 uplink resource, and the type 2 downlink resource is corresponding to the type 2 uplink resource. The correspondence herein is a correspondence between types of uplink and downlink resources, and does not represent a correspondence between quantities of uplink and downlink resources. For example, the type 1 downlink resource is one physical resource block PRB, that is, 180 kHz, the type 1 uplink resource has a bandwith of 30 kHz, and the 180 kHz type 1 downlink resource may be corresponding to at least one 30 kHz type 1 uplink resource. A specific correspondence may be preset. For example, a correspondence is related to a frequency band used in a system and is clearly specified in a standard or specification, or a correspondence is obtained according to a downlink synchronization signal or a reference signal that is sent by a system, or notification may be provided in system information. This is not limited in the embodiments of the present invention. In addition, the type 1 downlink resource and the type 2 downlink resource may be the same or different in the time domain and in the frequency domain. When the type 1 downlink resource and the type 2 downlink resource are the same in the time domain and in the frequency domain, the type 1 downlink resource and the type 2 downlink resource indicate a same downlink resource. In this case, the same downlink resource may be corresponding to both the type 1 uplink resource and the type 2 uplink resource. When the type 1 downlink resource and the type 2 downlink resource are different in the time domain, or in the frequency domain, or in both the time domain and the frequency domain, that the downlink resources are different in the time domain includes at least one of the following: different time startpoints, different periods, or different duration, and that the downlink resources are different in the frequency domain includes at least one of the following: different occupied frequency ranges, different occupied frequency startpoints, different quantities of occupied subcarriers, or the like. In addition, orthogonal frequency division multiplexing OFDM symbols are transmitted on both the type 1 downlink resource and the type 2 downlink resource, and a subcarrier spacing is 15 kHz.

3. Two Types of PRACH Channels:

Type 1 PRACH channel: A bandwidth occupied by the type 1 PRACH channel in the frequency domain is 3.75 kHz or 15 kHz. Information about the type 1 PRACH channel includes at least one of the following: a quantity of type 1 PRACH channels in the frequency domain, or index or location information of the type 1 PRACH channel in the frequency domain.

Type 2 PRACH channel: A bandwidth occupied by the type 2 PRACH channel in the frequency domain is greater than 15 kHz and less than or equal to 180 kHz. Information about the type 2 PRACH channel includes at least one of the following: a quantity of type 2 PRACH channels in the frequency domain, or index or location information of the type 2 PRACH channel in the frequency domain.

Application scenarios in the embodiments of the present invention can be substantially classified into three types according to different frequency resources used. In a first scenario, that is, a scenario of independent deployment, a new terminal capability is supported in dedicated frequency resource networking, and a used frequency resource may be a resource in a frequency band recycled from a GSM system, or in a frequency band used by a 3G system or an LTE system. In the scenario of independent deployment, a system supports an LTE terminal that has only one or more types of new terminal capabilities and has no other terminal capabilities. In a second scenario, that is, a scenario of guard space deployment, a frequency resource used by a system is located in a guard space between frequency bands used in an LTE system. In a third scenario, that is, a scenario of in-band deployment, a used frequency resource is located in one standard carrier in an LTE system, for example, within a bandbandwith of 10 MHz or 20 MHz, that is, both an ordinary LTE terminal capability and one or more types of new terminal capabilities are supported within one standard carrier in the LTE system. Therefore, in order not to affect normal communication of an ordinary LTE terminal, maximum sending power that can be used to send a downlink channel in an NBIOT system in the third scenario may be smaller.

FIG. 1 shows a system architecture of a communications system used in an embodiment of the present invention. The system architecture includes a base station 101, a user terminal 102, and a communication channel 103.

The base station 101 has a function of scheduling a shared channel, that is, performs scheduling based on a history of sending packet data to the user terminal 102. Scheduling means that, when a plurality of user terminals 102 share a transmission resource, a mechanism is required to effectively allocate a physical-layer resource, so as to obtain a statistical multiplexing gain.

There may be a plurality of user terminals 102. In addition, a user terminal 102 has functions of sending and receiving data by using a communication channel 103 established between the user terminal 102 and a base station 101. The user terminal 102 performs sending or receiving processing on a shared channel according to information sent by using a scheduling control channel. In addition, the user terminal 102 may be a mobile station, a mobile phone, a computer, a portable terminal, or the like. Types of the user terminals 102 may be the same, or may be different.

Data is received and sent between the base station 101 and the user terminal 102 by using the communication channel 103. The communication channel 103 may be a radio communication channel. The radio communication channel includes at least a shared channel and a scheduling control channel. The shared channel is shared between a plurality of user terminals 102 to send and receive packet data. The scheduling control channel is used to send shared-channel allocation, a corresponding scheduling result, and the like.

Figure 2:
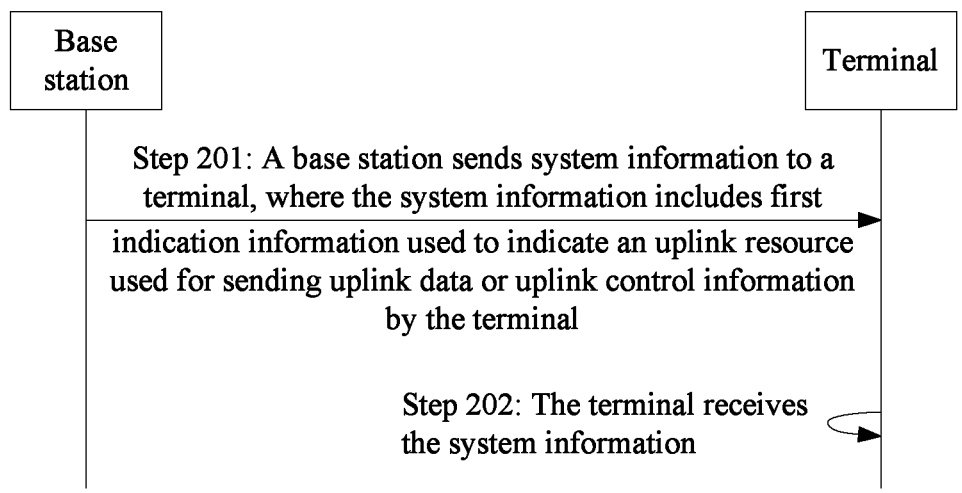
FIG. 2 is a schematic flowchart of a first data transmission method according to an embodiment of the present invention.

FIG. 2 is a schematic flowchart of a data transmission method according to an embodiment of the present invention. Referring to FIG. 2, the method includes the following several operations.

Operation 201: A base station sends system information to a terminal, where the system information includes first indication information used to indicate an uplink resource used for sending uplink data or uplink control information by the terminal.

The first indication information of the uplink resource includes information used to indicate whether the uplink resource is a type 1 uplink resource or a type 2 uplink resource. The type 1 uplink resource includes at least one subcarrier in a frequency domain and at least one SC-FDMA symbol in a time domain, where when a subcarrier quantity is greater than or equal to 2, subcarriers are orthogonal to each other, and a subcarrier spacing is 3.75 kHz; or the type 1 uplink resource includes at least one sub-channel in a frequency domain and at least one FDMA symbol in a time domain, where a bandwith of each sub-channel is 3.75 kHz. The type 2 uplink resource includes at least one subcarrier in the frequency domain and at least one SC-FDMA symbol in the time domain, where when a subcarrier quantity is greater than or equal to 2, subcarriers are orthogonal to each other, and a subcarrier spacing is 15 kHz.

In addition, the first indication information of the uplink resource further includes time-domain information and/or frequency-domain information of the type 1 uplink resource or the type 2 uplink resource.

The first indication information may indicate different information content according to different capabilities supported by the terminal. Specifically, if the terminal supports a type 1 terminal capability, the first indication information is used to indicate that the uplink resource is the type 1 uplink resource; if the terminal supports a type 2 terminal capability or a type 3 terminal capability, the first indication information is used to indicate that the uplink resource is the type 2 uplink resource; or if the terminal supports a type 1 terminal capability and a type 2 terminal capability, or the terminal supports a type 1 terminal capability and a type 3 terminal capability, the first indication information is used to indicate that the uplink resource is the type 1 uplink resource or the type 2 uplink resource.

It should be noted that the system information sent by the base station to the terminal is at least one of the following: system information carried on a physical broadcast channel (PBCH), a system information block sent, by means of scheduling based on downlink control information, or an information block sent in a non-scheduling manner. Sending in a non-scheduling manner means that a resource mapping manner for mapping an information block to a time-frequency resource for sending is a preset manner, for example, a preset manner that is clearly specified in a standard or specification.

In addition, when the base station sends the system information to the terminal, the base station may send the system information to all terminals in a cell. Before the system information is sent, if the base station does not know terminal capabilities supported by all the terminals in the cell, the system information may further include information about the type 1 uplink resource and information about the type 2 uplink resource. The information about the type 1 uplink resource is used for the terminal that supports the type 1 terminal capability or the terminal that supports the type 1 terminal capability and the type 2 terminal capability or the type 1 terminal capability and the type 3 terminal capability. The information about the type 2 uplink resource is used for the terminal that supports the type 2 terminal capability or the type 3 terminal capability or the terminal that supports the type 1 terminal capability and the type 2 terminal capability or the type 1 terminal capability and the type 3 terminal capability.

In addition, the first indication information of the uplink resource further includes time-domain information and/or frequency-domain information of the type 1 uplink resource or the type 2 uplink resource. The time-domain information includes at least one of the following: a specific radio frame in which the type 1 uplink resource or the type 2 uplink resource is available, a specific subframe in which the type 1 uplink resource or the type 2 uplink resource is available, or a period, a startpoint, and duration for availability of the type 1 uplink resource or the type 2 uplink resource. The frequency-domain information includes at least one of the following: a quantity of subcarriers included in the type 1 uplink resource or the type 2 uplink resource, a subcarrier index or location information of the type 1 uplink resource or the type 2 uplink resource in the frequency domain, or a subcarrier index or location information of a reference subcarrier in the type 1 uplink resource or the type 2 uplink resource in the frequency domain.

Operation 202: The terminal receives the system information sent by the base station, where the system information includes information about a type 1 uplink resource in a time domain and/or a frequency domain, and/or information about a type 2 uplink resource in the time domain and/or the frequency domain.

When the uplink resource includes the type 1 uplink resource and the type 2 uplink resource, time division multiplexing (TDM) may be used for the type 1 uplink resource and the type 2 uplink resource, and the system information may include the information about the type 1 uplink resource in the time domain, and the information about the type 2 uplink resource in the time domain; or frequency division multiplexing (FDM) may be used for the type 1 uplink resource and the type 2 uplink resource, and the system information may include the information about the type 1 uplink resource in the frequency domain, and the information about the type 2 uplink resource in the frequency domain; or a hybrid multiplexing manner of TDM and FDM may be used for the type 1 uplink resource and the type 2 uplink resource, and the system information may include the information about the type 1 uplink resource in the time domain and in the frequency domain, and the information about the type 2 uplink resource in the time domain and in the frequency domain.

It should be noted that the time-domain information includes at least one of the following: a specific radio frame in which the type 1 uplink resource or the type 2 uplink resource is available, a specific subframe in which the type 1 uplink resource or the type 2 uplink resource is available, or a period, a startpoint, and duration for availability of the type 1 uplink resource or the type 2 uplink resource; and the frequency-domain information includes at least one of the following: a quantity of subcarriers included in the type 1 uplink resource or the type 2 uplink resource, a subcarrier index or location information of the type 1 uplink resource or the type 2 uplink resource in the frequency domain, or a subcarrier index or location information of a reference subcarrier in the type 1 uplink resource or the type 2 uplink resource in the frequency domain.

That is, when the TDM is used for the type 1 uplink resource and the type 2 uplink resource, the system information is used to indicate that the time-domain information corresponding to the type 1 uplink resource and the time-domain information corresponding to the type 2 uplink resource are mutually exclusive, that is, no type 2 uplink resource is available when the type 1 uplink resource is available, or no type 1 uplink resource is available when the type 2 uplink resource is available. When the FDM is used for the type 1 uplink resource and the type 2 uplink resource, the system information is used to indicate that the frequency-domain information corresponding to the type 1 uplink resource and the frequency-domain information corresponding to the type 2 uplink resource are mutually exclusive, that is, no type 2 uplink resource is available on a frequency on which the type 1 uplink resource is available, or no type 1 uplink resource is available on a frequency on which the type 2 uplink resource is available. When the hybrid multiplexing manner of the TDM and the FDM is used for the type 1 uplink resource and the type 2 uplink resource, the system information is used to indicate that the time-domain information corresponding to the type 1 uplink resource and the time-domain formation corresponding to the type 2 uplink resource are mutually exclusive, and the frequency-domain information corresponding to the type 1 uplink resource and the frequency-domain information corresponding to the type 2 uplink resource are mutually exclusive, that is, indicating, within a period of time, that the time-domain information corresponding to the type 1 uplink resource and the time-domain information corresponding to the type 2 uplink resource are mutually exclusive, and indicating, within another period of time, that the frequency-domain information corresponding to the type 1 uplink resource and the frequency-domain information corresponding to the type 2 uplink resource are mutually exclusive.

Specifically, when the terminal supports the type 1 terminal capability, the terminal may obtain, from the system information, the information about the type 1 uplink resource. When the terminal supports the type 2 terminal capability and/or the type 3 terminal capability, the terminal may obtain, from the system information, the information about the type 2 uplink resource. When the terminal supports at least one of the type 1 terminal capability, the type 2 terminal capability, or the type 3 terminal capability, the terminal may obtain, from the system information, at least one of the information about the type 1 uplink resource or the information about the type 2 uplink resource.

In addition to obtaining the first indication information of the uplink resource from the system information sent by the base station, the terminal may obtain the first indication information of the uplink resource according to preset information. That is, the preset information includes information content indicated by the first indication information, and the preset information may be preset. The preset information is clearly specified in the standard or specification; there is a correspondence between the preset information and information about a frequency band used for system deployment; there is a correspondence between the preset information and a synchronization signal or a reference signal sent in downlink by a system, where the correspondence may be described in the standard or specification; or the like. This is not limited in this embodiment of the present invention.

Figure 3:
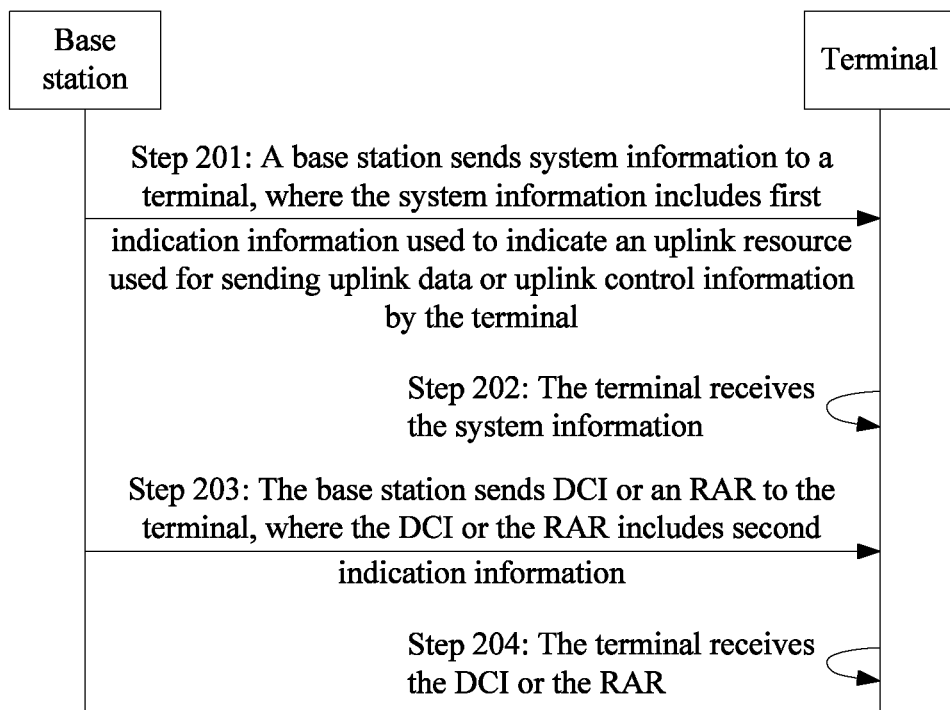
FIG. 3 is a schematic flowchart of a second data transmission method according to an embodiment of the present invention.

Further, referring to FIG. 3, after operation 202, the method further includes the following operations.

Operation 203: The base station sends DCI or an RAR to the terminal, where the DCI or the RAR includes second indication information of the uplink resource used for sending the uplink data by the terminal.

The second indication information includes subcarrier information or sub-channel information of the type 1 uplink resource or the type 2 uplink resource used for sending the uplink data by the terminal. The subcarrier information includes at least one of the following: a subcarrier quantity, a subcarrier index, or information used to indicate a location or an index of a subcarrier in the frequency domain. The sub-channel information includes at least one of the following: a sub-channel quantity, a sub-channel index, or information used to indicate a location or an index of a sub-channel in the frequency domain.

The terminal may support one or two of the type 1 terminal capability, the type 2 terminal capability, or the type 3 terminal capability, or all of the three types of terminal capabilities. Therefore, when terminal capabilities supported by the terminal are different, the base station sends the DCI or the RAR to the terminal by using different methods. Details are as follows.

When the terminal supports the type 1 terminal capability, that the base station sends DCI or an RAR to the terminal includes: sending, by the base station, the DCI or the RAR on a type 1 downlink resource, where the DCI or the RAR further includes scheduling information used to schedule the terminal to send the uplink data.

When the terminal supports the type 2 terminal capability and the type 3 terminal capability, that the base station sends DCI or an RAR to the terminal includes: sending, by the base station, the DCI or the RAR on a type 2 downlink resource, where the DCI or the RAR includes scheduling information used to schedule the terminal to send the uplink data.

When the terminal supports the type 1 terminal capability and the type 2 terminal capability, or the terminal supports the type 1 terminal capability and the type 3 terminal capability, that the base station sends DCI or an RAR to the terminal includes: sending, by the base station, the DCI or the RAR on a type 1 downlink resource and/or a type 2 downlink resource, where the DCI or the RAR includes scheduling information used to schedule the terminal to send the uplink data.

When the DCI or the RAR includes the second indication information, and the terminal supports the type 1 terminal capability and the type 2 terminal capability or the terminal supports the type 1 terminal capability and the type 3 terminal capability, the DCI or the RAR further includes third indication information used to indicate whether the uplink resource used for sending the uplink data by the terminal is the type 1 uplink resource or the type 2 uplink resource. Alternatively, regardless of whether the terminal supports one, two, or three of the type 1 terminal capability, the type 2 terminal capability, or the type 3 terminal capability, the DCI or the RAR includes third indication information used to indicate whether the uplink resource used for sending the uplink data by the terminal is the type 1 uplink resource or the type 2 uplink resource.

Specifically, the DCI or the RAR includes information about one indicator field. The indicator field indicates, by using different values, whether the uplink resource used for sending the uplink data by the terminal is the type 1 uplink resource or the type 2 uplink resource. The indicator field also indicates subcarrier information or sub-channel information of the type 1 uplink resource used for sending the uplink data by the terminal.

Alternatively, the DCI or the RAR includes information about two indicator fields. One indicator field indicates, by using different values, whether the uplink resource used for sending the uplink data by the terminal is the type 1 uplink resource or the type 2 uplink resource, and the other indicator field indicates subcarrier information or sub-channel information of the type 1 uplink resource used for sending the uplink data by the terminal.

Alternatively, if the DCI is in a first DCI format, the third indication information indicates subcarrier information or sub-channel information of the type 1 uplink resource used for sending the uplink data by the terminal; or if the DCI is in a second DCI format, the third indication information indicates subcarrier information or sub-channel information of the type 2 uplink resource used for sending the uplink data by the terminal.

Alternatively, if CRC in the DCI is scrambled by using a first scrambling code, the third indication information indicates subcarrier information or sub-channel information of the type 1 uplink resource used for sending the uplink data by the terminal; or if the CRC in the DCI is scrambled by using a second scrambling code, the third indication information indicates subcarrier information or sub-channel information of the type 2 uplink resource used for sending the uplink data by the terminal.

It should be noted that the type 1 downlink resource is corresponding to the type 1 uplink resource, and the type 2 downlink resource is corresponding to the type 2 uplink resource. The correspondence herein is a correspondence between types of uplink and downlink resources, and does not represent a correspondence between quantities of uplink and downlink resources. For example, the type 1 downlink resource is one physical resource block PRB, that is, 180 kHz, the type 1 uplink resource includes 30 kHz, and the 180 kHz type 1 downlink resource may be corresponding to at least one 30 kHz type 1 uplink resource. A specific correspondence may be preset. For example, a correspondence is related to a frequency band used in a system and is clearly specified in a standard or specification, or a correspondence is obtained according to a downlink synchronization signal or a reference signal that is sent by a system, or notification may be provided in system information. This is not limited in the embodiments of the present invention. In addition, the type 1 downlink resource and the type 2 downlink resource may be the same or different in the time domain and in the frequency domain. When the type 1 downlink resource and the type 2 downlink resource are the same in the time domain and in the frequency domain, the type 1 downlink resource and the type 2 downlink resource indicate a same downlink resource. In this case, the same downlink resource may be corresponding to both the type 1 uplink resource and the type 2 uplink resource. When the type 1 downlink resource and the type 2 downlink resource are different in the time domain, or in the frequency domain, or in both the time domain and the frequency domain, that the downlink resources are different in the time domain includes at least one of the following: different time startpoints, different periods, or different duration, and that the downlink resources are different in the frequency domain includes at least one of the following: different occupied frequency ranges, different occupied frequency startpoints, different quantities of occupied subcarriers, or the like. In addition, orthogonal frequency division multiplexing OFDM symbols are transmitted on both the type 1 downlink resource and the type 2 downlink resource, and a subcarrier spacing is 15 kHz.

In addition, the scheduling information that is used to schedule the terminal to send the uplink data and that is included in the DCI or the RAR indicates an uplink data sending format, and includes at least one of the following: a quantity of subcarriers used in the frequency domain, a used modulation scheme, or a quantity of resources used in the time domain, such as a subframe quantity or a quantity of bits included in a transport block. Specifically, when the terminal supports the type 1 terminal capability and/or the type 2 terminal capability, the quantity of subcarriers used in the frequency domain is constantly 1, and the DCI or the RAR may not include the subcarrier quantity; or when the terminal supports the type 3 terminal capability, at least one subcarrier, and a maximum of 12 subcarriers, are used in the frequency domain.

In addition, the uplink data sent by the terminal is mapped onto a physical uplink shared channel. If there is uplink control information that needs to be sent at a same moment as the uplink data, both the uplink control information and the uplink data may be mapped onto the physical uplink shared channel. The uplink control information includes acknowledgment information used to indicate whether downlink data is correctly received or information that reflects channel state information CSI.

In addition, when the first DCI format and the second DCI format are used for sending, different time-frequency resources may be used, or quantities of bits included in the DCI in the first DCI format and in the DCI in the second DCI format are different. Alternatively, when the first DCI format and the second DCI format are used for sending, used time-frequency resources are different, and quantities of bits included in the DCI in the first DCI format and in the DCI in the second DCI format are different. Alternatively, when the first DCI format and the second DCI format are used for sending, used time-frequency resources are the same, and quantities of bits included in the DCI in the first DCI format and in the DCI in the second DCI format are the same.

Operation 204: The terminal receives the DCI or the RAR sent by the base station, where the DCI or the RAR includes the second indication information.

Correspondingly, when the terminal supports the type 1 terminal capability, the terminal receives, on the type 1 downlink resource, the DCI or the RAR sent by the base station. The DCI or the RAR further includes the scheduling information used to schedule the terminal to send the uplink data.

When the terminal supports the type 2 terminal capability and the type 3 terminal capability, the terminal receives, on the type 2 downlink resource, the DCI or the RAR sent by the base station. The DCI or the RAR includes scheduling information used to schedule the terminal to send the uplink data.

When the terminal supports the type 1 terminal capability and the type 2 terminal capability, or the terminal supports the type 1 terminal capability and the type 3 terminal capability, the terminal may receive, on the type 1 downlink resource and/or the type 2 downlink resource, the DCI or the RAR sent by the base station. The DCI or the RAR includes scheduling information used to schedule the terminal to send the uplink data.

Optionally, when the terminal supports the type 1 terminal capability and the type 2 terminal capability or the terminal supports the type 1 terminal capability and the type 3 terminal capability, higher layer signaling, such as radio resource control (RRC) signaling, RRC reconfiguration signaling, or Media Access Control (MAC) signaling, indicates whether the uplink resource used by the terminal is the type 1 uplink resource or the type 2 uplink resource. Before receiving the higher layer signaling, the terminal may detect the DCI or the RAR on both the type 1 downlink resource and the type 2 downlink resource. When detecting the DCI, the terminal may detect an indicator field included in the DCI or the RAR, a DCI format, or different scrambling codes for CRC in the DCI. For details, refer to operation 203, and details are not described again in this embodiment of the present invention.

When the DCI or the RAR includes the second indication information, and the terminal supports the type 1 terminal capability and the type 2 terminal capability or the terminal supports the type 1 terminal capability and the type 3 terminal capability, the DCI or the RAR further includes third indication information used to indicate whether the uplink resource used for sending the uplink data by the terminal is the type 1 uplink resource or the type 2 uplink resource. Alternatively, regardless of whether the terminal supports one, two, or three of the type 1 terminal capability, the type 2 terminal capability, or the type 3 terminal capability, the DCI or the RAR includes third indication information used to indicate whether the uplink resource used for sending the uplink data by the terminal is the type 1 uplink resource or the type 2 uplink resource.

It should be noted that the third indication information and the scheduling information that are in operation 204 are respectively similar to the third indication information and the scheduling information that are in operation 203, and details are not described again in this embodiment of the present invention.

Figure 4:
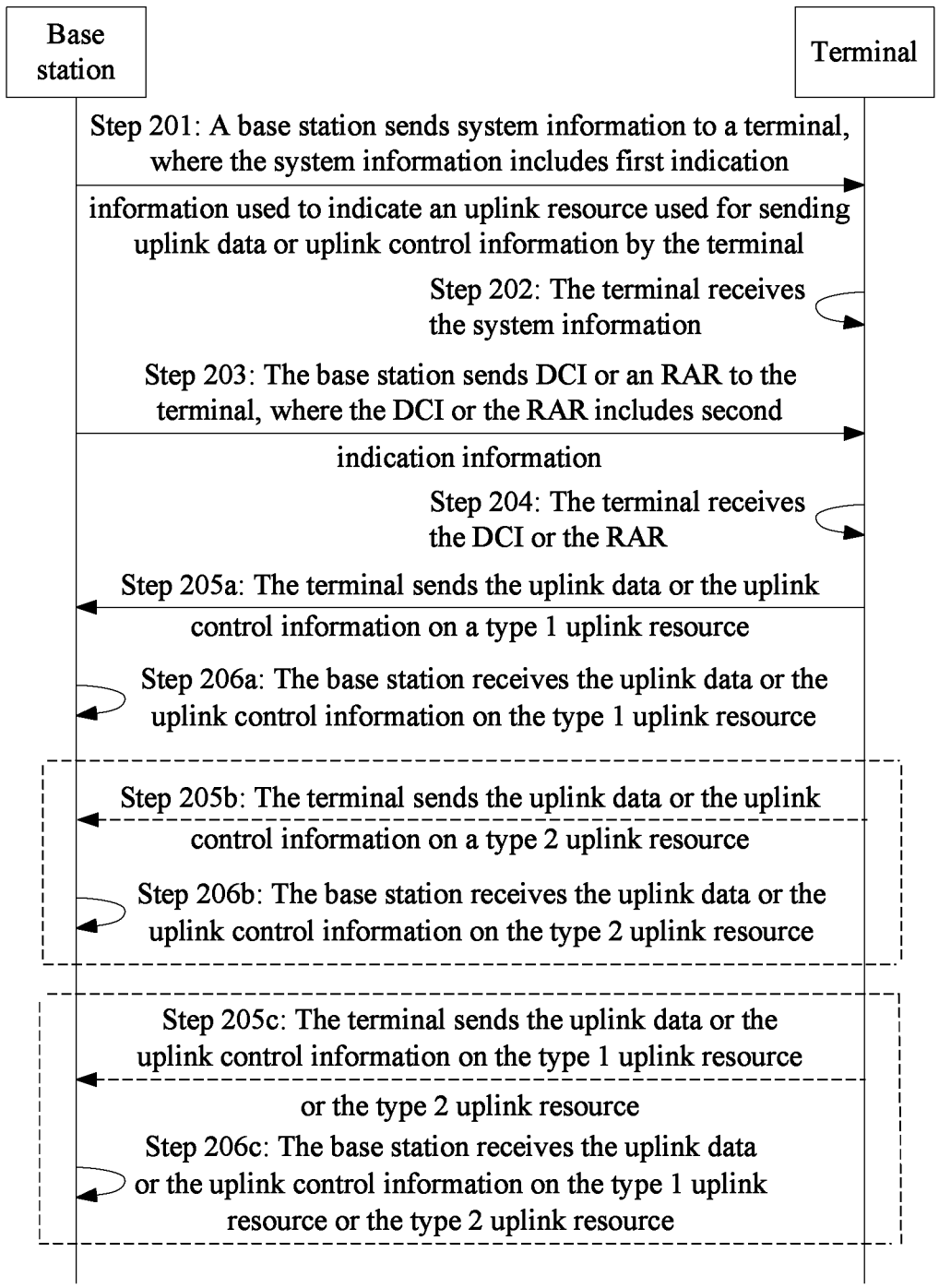
FIG. 4 is a schematic flowchart of a third data transmission method according to an embodiment of the present invention.

Further, referring to FIG. 4, when the DCI or the RAR further includes the scheduling information used to schedule the terminal to send the uplink data, after operation 204, the method further includes:

Operation 205a: If the terminal supports the type 1 terminal capability, the terminal sends the uplink data or the uplink control information on the type 1 uplink resource.

Correspondingly, the method further includes:

Operation 206a: The base station receives, on the type 1 uplink resource, the uplink data or the uplink control information sent on the type 1 uplink resource by the terminal that supports the type 1 terminal capability.

Alternatively, after operation 204, the method further includes:

Operation 205b: If the terminal supports the type 2 terminal capability or the type 3 terminal capability, the terminal sends the uplink data or the uplink control information on the type 2 uplink resource.

Correspondingly, the method further includes:

Operation 206b: The base station receives, on the type 2 uplink resource, the uplink data or the uplink control information sent on the type 2 uplink resource by the terminal that supports the type 2 terminal capability or the type 3 terminal capability.

Alternatively, after operation 204, the method further includes:

Operation 205c: If the terminal supports the type 1 terminal capability and the type 2 terminal capability, or the terminal supports the type 1 terminal capability and the type 3 terminal capability, the terminal sends the uplink data or the uplink control information on the type 1 uplink resource or the type 2 uplink resource.

Correspondingly, the method further includes:

Operation 206c: The base station receives, on the type 1 uplink resource, the uplink data sent on the type 1 uplink resource by the terminal that supports the type 1 terminal capability and the type 2 terminal capability; or receives, on the type 2 uplink resource, the uplink data sent on the type 2 uplink resource by the terminal that supports the type 1 terminal capability and the type 3 terminal capability.

It should be noted that a sequence of performing the three groups of operations, that is, operation 205a and operation 206a, operation 205b and operation 206b, and operation 205c and operation 206c is not limited, and the three groups of operations are parallel. Specifically, which group or groups of the operations are performed by the base station and the terminal depends on a terminal capability or terminal capabilities supported by the terminal.

Further, that the terminal sends the uplink data on the type 1 uplink resource in operation 205a and operation 205c includes: sending, by the terminal on the type 1 uplink resource according to a first timing relationship corresponding to the type 1 uplink resource, the uplink data scheduled by using the scheduling information. A spacing between subcarriers in the type 1 uplink resource is 3.75 kHz, or a bandwith of each sub-channel is 3.75 kHz.

The first timing relationship corresponding to the type 1 uplink resource is used to indicate a timing relationship between the scheduling information included in the DCI or the RAR and the uplink data scheduled by using the scheduling information.

Correspondingly, that the base station receives, on the type 1 uplink resource, the uplink data sent on the type 1 uplink resource by the terminal in operation 206a and operation 206c includes: receiving, by the base station on the type 1 uplink resource according to a first timing relationship corresponding to the type 1 uplink resource, the uplink data that is scheduled by using the scheduling information and that is sent by the terminal. A spacing between subcarriers in the type 1 uplink resource is 3.75 kHz, or a bandwidth of each sub-channel is 3.75 kHz.

Figure 4A:
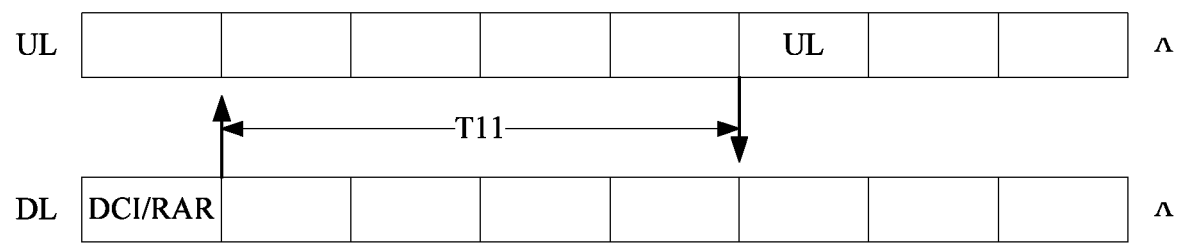
FIG. 4A is a schematic diagram of a first timing relationship of a type 1 uplink resource according to an embodiment of the present invention.

It should be noted that the timing relationship between the scheduling information included in the DCI or the RAR and the uplink data scheduled by using the scheduling information refers to a time difference between a subframe number of an end subframe for sending the DCI or the RAR and a subframe number of a start subframe for sending the uplink data, and a frame quantity, a subframe quantity, a scheduling time interval TTI quantity, or the like is used as a unit. Alternatively, when a plurality of subframes are occupied for sending the DCI or the RAR, the timing relationship may refer to a time difference between a subframe number of a start subframe for sending the DCI or the RAR and a subframe number of a start subframe for sending the uplink data, or refer to a time difference, when the terminal correctly receives the DCI or the RAR, between a subframe number of a subframe for sending the DCI or the RAR and a subframe number of a start subframe for sending the uplink data. For example, a time difference T11 between a subframe number of an end subframe for sending the DCI or the RAR and a subframe number of a start subframe for sending the uplink data is used in the present invention, as shown in FIG. 4A.

Figure 5:
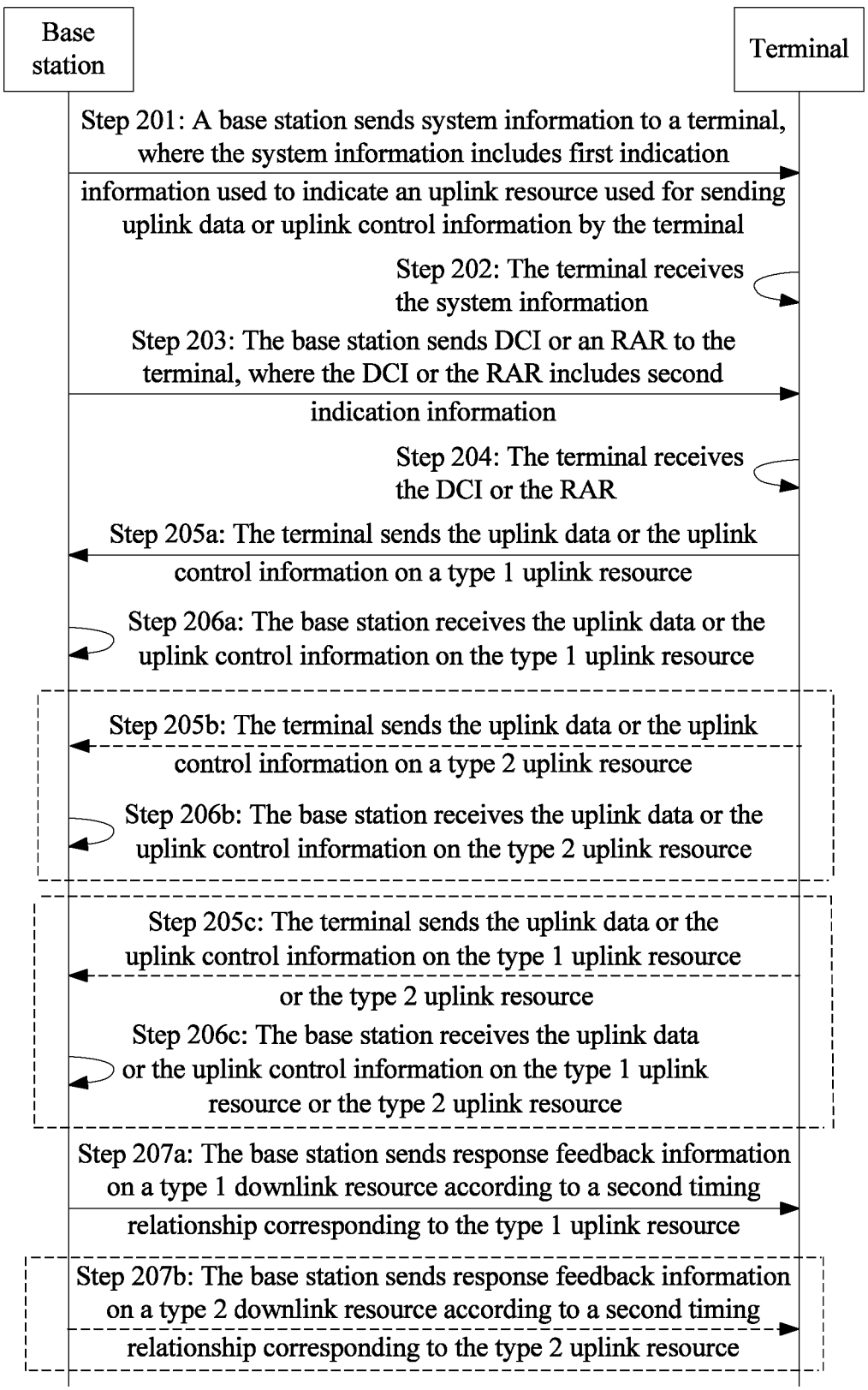
FIG. 5 is a schematic flowchart of a fourth data transmission method according to an embodiment of the present invention.

Further, referring to FIG. 5, after the base station receives, on the type 1 uplink resource, the uplink data that is scheduled by using the scheduling information and that is sent by the terminal, the method further includes:

Operation 207a: The base station sends response feedback information to the terminal on the type 1 downlink resource according to a second timing relationship corresponding to the type 1 uplink resource.

The second timing relationship corresponding to the type 1 uplink resource is used to indicate a timing relationship between the uplink data sent by the terminal and the response feedback information corresponding to the uplink data.

Figure 5A:
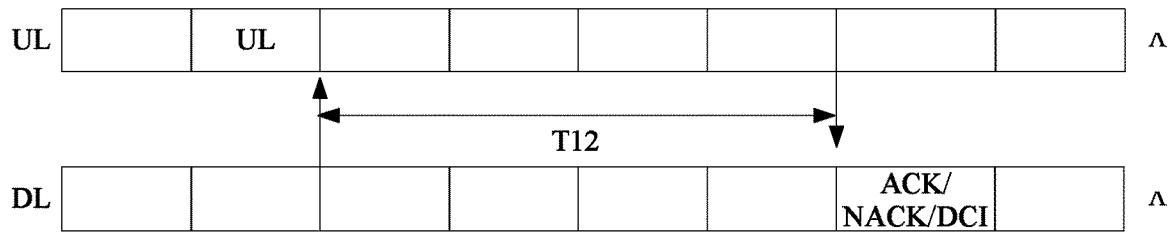
FIG. 5A is a schematic diagram of a second timing relationship of a type 1 uplink resource according to an embodiment of the present invention.

It should be noted that the timing relationship between the uplink data sent by the terminal and the response feedback information corresponding to the uplink data refers to a time difference between a subframe number of an end subframe for sending the uplink data by the terminal and a subframe number of a start subframe for sending the response feedback information corresponding to the uplink data, and a frame quantity, a subframe quantity, a scheduling time interval TTI quantity, or the like is used as a unit. Alternatively, when a plurality of subframes are occupied for sending the uplink data sent by the terminal, the timing relationship may refer to a time difference between a subframe number of a start subframe for sending the uplink data by the terminal and a subframe number of a start subframe for sending the response feedback information corresponding to the uplink data, or refer to a time difference, when the base station correctly receives the uplink data sent by the terminal, between a subframe number of a subframe for sending the uplink data and a subframe number of a start subframe for sending the response feedback information corresponding to the uplink data. For example, a time difference T12 between a subframe number of an end subframe for sending the uplink data by the terminal and a subframe number of a start subframe for sending the response feedback information corresponding to the uplink data is used in the present invention, as shown in FIG. 5A.

In addition, the first timing relationship T11 corresponding to the type 1 uplink resource and the second timing relationship T12 corresponding to the type 1 uplink resource may be preset, may be included in the DCI or the RAR, or may be included in the system information. This is not specifically limited in this embodiment of the present invention. Being preset means having been clearly specified in a standard or specification.

In addition, the response feedback information sent to the terminal by the base station on the type 1 downlink resource may be an ACK/a NACK. When the response feedback information is an ACK, it indicates that the base station correctly receives the uplink data sent by the terminal; or when the response feedback information is a NACK, it indicates that the base station receives the uplink data sent by the terminal, but does not decode the uplink data correctly. The ACK/NACK may be carried on a dedicated physical channel, and a resource mapping manner of the physical channel is preset, for example, clearly specified in a standard or specification; or the ACK/NACK may be included in downlink control information DCI to be sent next time, for example, the DCI includes an indicator field that is used to indicate the ACK/NACK. This is not limited in this embodiment of the present invention.

Similarly, that the terminal sends the uplink data on the type 2 uplink resource in operation 205b and operation 205c includes: sending, by the terminal on the type 2 uplink resource according to a first timing relationship corresponding to the type 2 uplink resource, the uplink data scheduled by using the scheduling information. A spacing between subcarriers in the type 2 uplink resource is 15 kHz.

The first timing relationship corresponding to the type 2 uplink resource is used to indicate a timing relationship between the scheduling information included in the DCI or the RAR and the uplink data scheduled by using the scheduling information.

Figure 5B:
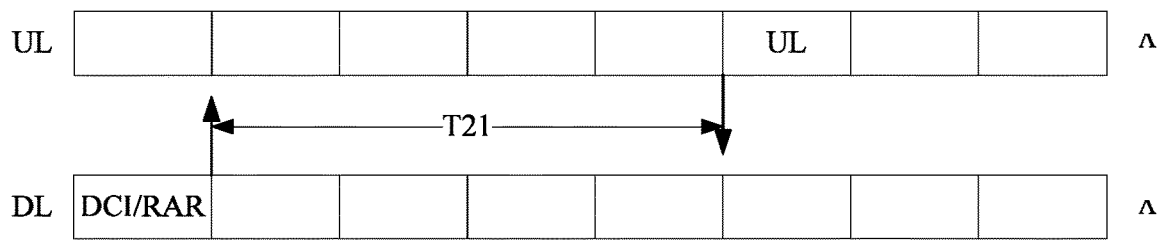
FIG. 5B is a schematic diagram of a first timing relationship of a type 2 uplink resource according to an embodiment of the present invention.

It should be noted that the timing relationship between the scheduling information included in the DCI or the RAR and the uplink data scheduled by using the scheduling information refers to a time difference between a subframe number of an end subframe for sending the DCI or the RAR and a subframe number of a start subframe for sending the uplink data, and a frame quantity, a subframe quantity, a scheduling time interval TTI quantity, or the like is used as a unit. Alternatively, when a plurality of subframes are occupied for sending the DCI or the RAR, the timing relationship may refer to a time difference between a subframe number of a start subframe for sending the DCI or the RAR and a subframe number of a start subframe for sending the uplink data, or refer to a time difference, when the terminal correctly receives the DCI or the RAR, between a subframe number of a subframe for sending the DCI or the RAR and a subframe number of a start subframe for sending the uplink data. For example, a time difference T21 between a subframe number of an end subframe for sending the DCI or the RAR and a subframe number of a start subframe for sending the uplink data is used in the present invention, as shown in FIG. 5B.

Correspondingly, that the base station receives, on the type 2 uplink resource, the uplink data sent on the type 2 uplink resource by the terminal in operation 206b and operation 206c includes: receiving, by the base station on the type 2 uplink resource according to a first timing relationship corresponding to the type 2 uplink resource, the uplink data that is scheduled by using the scheduling information and that is sent by the terminal. A spacing between subcarriers in the type 2 uplink resource is 15 kHz.

Further, after the base station receives, on the type 2 uplink resource, the uplink data that is scheduled by using the scheduling information and that is sent by the terminal, the method further includes:

Operation 207b: The base station sends response feedback information to the terminal on the type 2 downlink resource according to a second timing relationship corresponding to the type 2 uplink resource.

The second timing relationship corresponding to the type 2 uplink resource is used to indicate a timing relationship between the uplink data sent by the terminal and the response feedback information corresponding to the uplink data.

Figure 5C:
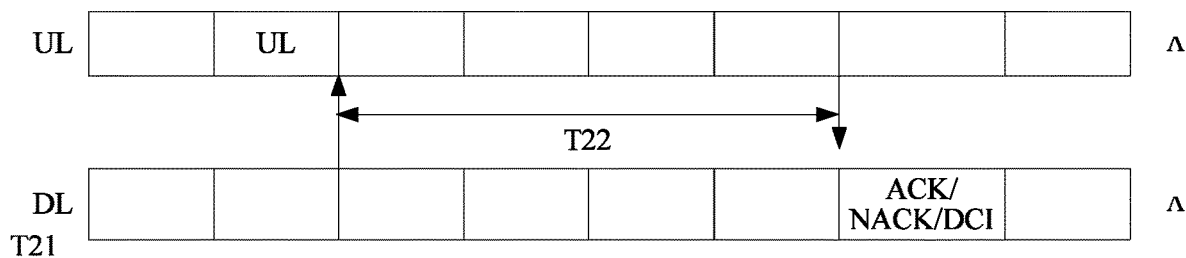
FIG. 5C is a schematic diagram of a second timing relationship of a type 2 uplink resource according to an embodiment of the present invention.

It should be noted that the timing relationship between the uplink data sent by the terminal and the response feedback information corresponding to the uplink data refers to a time difference between a subframe number of an end subframe for sending the uplink data by the terminal and a subframe number of a start subframe for sending the response feedback information corresponding to the uplink data, and a frame quantity, a subframe quantity, a scheduling time interval TTI quantity, or the like is used as a unit. Alternatively, when a plurality of subframes are occupied for the uplink data sent by the terminal, the timing relationship may refer to a time difference between a subframe number of a start subframe for sending the uplink data by the terminal and a subframe number of a start subframe for sending the response feedback information corresponding to the uplink data, or refer to a time difference, when the base station correctly receives the uplink data sent by the terminal, between a subframe number of a subframe for sending the uplink data and a subframe number of a start subframe for sending the response feedback information corresponding to the uplink data. For example, a time difference T22 between a subframe number of an end subframe for sending the uplink data by the terminal and a subframe number of a start subframe for sending the response feedback information corresponding to the uplink data is used in the present invention, as shown in FIG. 5C.

In addition, the first timing relationship T21 corresponding to the type 2 uplink resource and the second timing relationship T22 corresponding to the type 2 uplink resource may be preset, may be included in the DCI or the RAR, or may be included in the system information. This is not specifically limited in this embodiment of the present invention. Being preset means having been clearly specified in a standard or specification.

In addition, the response feedback information sent to the terminal on the type 2 downlink resource by the base station may be an ACK/a NACK. When the response feedback information is an ACK, it indicates that the base station correctly receives the uplink data sent by the terminal; or when the response feedback information is a NACK, it indicates that the base station receives the uplink data sent by the terminal, but does not decode the uplink data correctly. The ACK/NACK may be carried on a dedicated physical channel, and a resource mapping manner of the physical channel is preset, for example, clearly specified in a standard or specification; or the ACK/NACK may be included in downlink control information DCI to be sent next time, for example, the DCI includes an indicator field that is used to indicate the ACK/NACK. This is not limited in this embodiment of the present invention.

In addition, the first timing relationship T11 corresponding to the type 1 uplink resource and the first timing relationship T21 corresponding to the type 2 uplink resource may be the same, or may be different. The second timing relationship T12 corresponding to the type 1 uplink resource and the second timing relationship T22 corresponding to the type 2 uplink resource may be the same, or may be different.

It should be noted that a sequence of performing operation 207a and operation 207b is not limited, the two operations are parallel, and which operation is performed by the base station depends on a type of an uplink resource used by the terminal.

Figure 6:
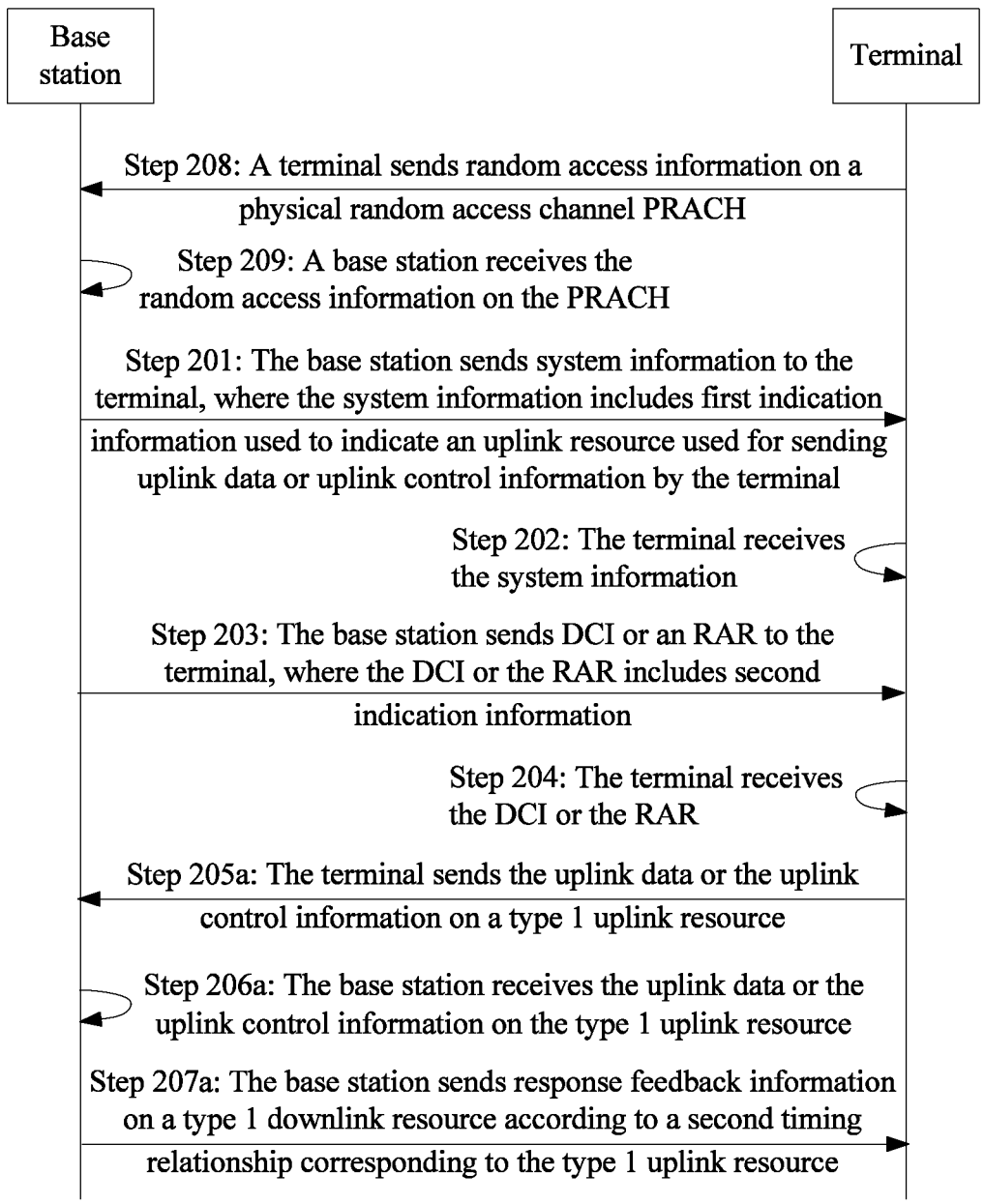
FIG. 6 is a schematic flowchart of a fifth data transmission method according to an embodiment of the present invention.

Further, referring to FIG. 6, before operation 201, the method further includes the following operations.

Operation 208: The terminal sends random access information on a PRACH, where a bandwidth occupied by each PRACH channel in the frequency domain is approximately 3.75 kHz or 15 kHz, or is greater than 15 kHz and less than or equal to 180 kHz, and the random access information is a random preamble, an orthogonal sequence code, or a modulation symbol.

Optionally, a bandwidth occupied by each PRACH channel in the frequency domain is greater than 0 and less than 3.75 kHz. For example, when a bandwidth occupied by each PRACH channel in the frequency domain is 1.25 kHz or 2.5 kHz, only one piece of single-carrier random access information is sent on each PRACH channel.

The random preamble includes a cyclic prefix CP and a sequence SEQ. The random preamble is generated by a Zadoff-Chu sequence having a zero-correlation zone, or generated by one or more ZC root sequences. The terminal uses a random preamble sequence set configured on a network side. A quantity of available random preambles in each cell may be configured on the network side or clearly specified in a standard or specification. A random preamble sequence is first obtained by cyclically shifting a ZC root sequence. If a required quantity of available random preambles in each cell cannot be generated by cyclically shifting a single ZC root sequence, another random preamble sequence is generated from a ZC root sequence corresponding to a subsequent logic index. Logic indexes are cyclic and continuous and values of the logic indexes approximately range from 0 to 837.

The $u^{th}$ ZC root sequence $x_u(n)$ is shown in formula (1), where $N_{ZC}$ is a length of the ZC sequence, for example, the length is a prime number such as 139, 251, or 839. A random access preamble is obtained by cyclically shifting the $u^{th}$ ZC root sequence $x_u(n)$ by $N_{CS}$ according to formula (2).

$$x_u(n) = e^{-j\frac{\pi u n(n+1)}{N_{ZC}}}, 0 \leq n \leq N_{ZC} - 1 \quad (1)$$

$$x_{u,v}(n) = x_u((n + C_v) \bmod N_{ZC}) \quad (2)$$

In the formulas, u is a ZC root sequence index, $N_{CS}$ is a cyclic shift length, a cell coverage radius depends on the cyclic shift $N_{CS}$, $C_v$ is a cyclic shift value, v is a cycle quantity, and mod is a symbol of a MOD function. Available random preambles in each cell are obtained according to an extended sequence quantity obtained by using different u values and a cyclic shift for sequence generation, and the terminal randomly selects and sends one of the available random preambles of each cell.

It should be noted that when the random access information is an orthogonal sequence code, the orthogonal sequence code is not generated from a ZC sequence, but the orthogonal sequence code meets orthogonality, for example, an orthogonal code generated by a Hadamard (Hadamard) matrix. A quantity of available orthogonal sequence codes in each cell may be configured on the network side or clearly specified in a standard or specification. An available orthogonal sequence code set for each cell is configured on the network side, or generated according to a preset rule. The terminal randomly selects and sends one of the available orthogonal sequence codes of each cell. When the random access information is a modulation symbol, and the terminal needs to send uplink data, the terminal directly sends, on a PRACH channel, a symbol obtained by modulating the uplink data, or the terminal sends a particular modulation symbol on the PRACH channel. Information carried in the modulation symbol is used to request, from the base station, a resource for sending the uplink data.

Specifically, the terminal may send the random access information to the base station on the PRACH by using different methods. Details are as follows.

Method 1: The terminal sends a randomly selected random preamble or orthogonal sequence code to the base station on a randomly selected PRACH channel at each random access information sending opportunity.

That is, formats of random preambles or orthogonal sequence codes used by the terminal are the same, and sequence sets of used random preambles or orthogonal sequence codes are the same. The sequence sets may be preset, or may be configured in system information. The terminal randomly selects one random preamble or orthogonal sequence code from the sequence sets, and sends the random preamble or the orthogonal sequence code. A bandwidth occupied by each PRACH channel in the frequency domain is 3.75 kHz or 15 kHz, or is greater than 15 kHz and less than or equal to 180 kHz, or is greater than 0 and less than 3.75 kHz. When there is at least one PRACH channel at a same sending moment in the frequency domain, the terminal randomly selects a PRACH channel and sends a randomly selected random preamble or orthogonal sequence code on the PRACH channel.

Figure 7:
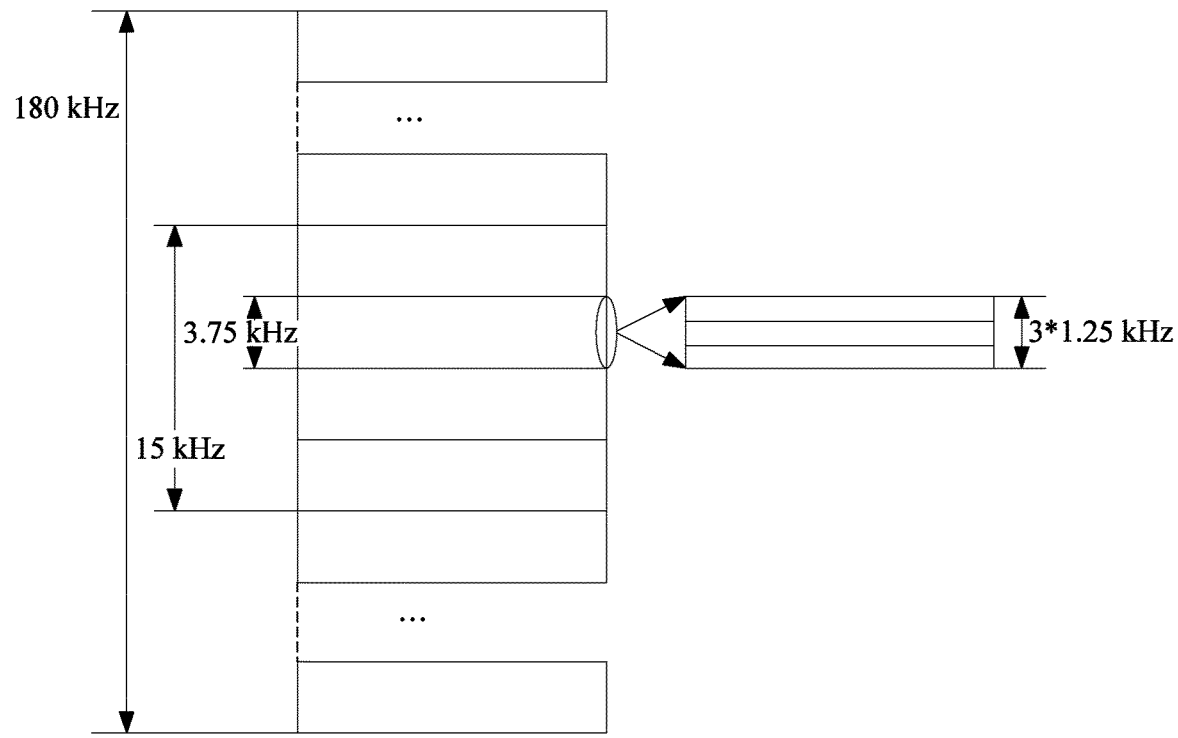
FIG. 7 is a schematic diagram of a preamble sending format according to an embodiment of the present invention.

For example, as shown in FIG. 7, a random preamble or an orthogonal sequence code is sent within 3.75 kHz, and a subcarrier spacing for the random preamble is 1.25 kHz, 312.5 Hz, or smaller. One PRB includes 48 3.75 kHz subcarriers or 12 15 kHz subcarriers. All or some of these subcarriers may be configured by the base station to send a random preamble or an orthogonal sequence code. For example, a bandwith of each PRACH channel is 3.75 kHz, and all of the 48 subcarriers in one PRB are configured as PRACH channels. The terminal may randomly select one random preamble or orthogonal sequence code from a sequence set of random preambles or orthogonal sequence codes according to configuration information of the system information, and randomly select one of the 48 PRACH channels to send the random preamble or the orthogonal sequence code.

Method 2: The terminal sends a random preamble or an orthogonal sequence code to the base station at n times, where the terminal occupies a PRACH channel at each random access information sending opportunity, to send a segment of the random preamble or the orthogonal sequence code, and n is an integer greater than or equal to 1.

That is, formats of random preambles or orthogonal sequence codes used by the terminal are the same, and sequence sets of used random preambles or orthogonal sequence codes are the same. The sequence sets may be preset, or may be configured in system information. The terminal randomly selects one random preamble or orthogonal sequence code from the sequence sets, and sends the random preamble or the orthogonal sequence code. Each random preamble is not sent at a time, but is segmented and sent by segments. For example, for a random preamble or an orthogonal sequence code with a length of 139 or 571.

Figure 8:
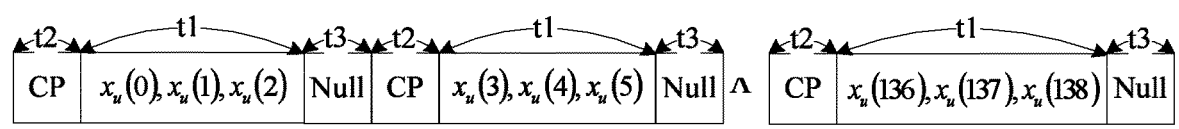
FIG. 8 is a schematic diagram of another preamble sending format according to an embodiment of the present invention.
Figure 9:
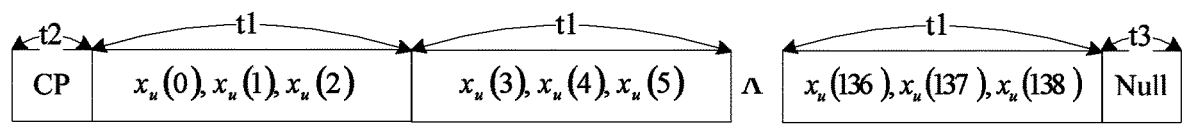
FIG. 9 is a schematic diagram of still another preamble sending format according to an embodiment of the present invention.

The terminal sends three symbols of the random preamble or the orthogonal sequence code each time and occupies three subcarriers in the frequency domain, occupies next three subcarriers at next sending, and so on. A format of sending a preamble in the time domain is shown in FIG. 8 or FIG. 9. When a random preamble with a length of 139 is sent, a subcarrier spacing used for sending the random preamble on the PRACH channel is 1.25 kHz; or when a random preamble with a length of 571 is sent, a subcarrier spacing used for sending the random preamble on the PRACH channel is 312.5 Hz.

It should be noted that each random access information sending opportunity refers to a sending moment of a PRACH channel, that is, specific radio frames and/or subframes in which the PRACH channel is allowed to be sent; or further includes frequency resource information occupied by a PRACH channel when the PRACH channel is sent at a corresponding moment. Information about the random access information sending opportunity may be configured in the system information and/or specified in a standard or specification.

Further, before the terminal sends the random access information to the base station, the method further includes:

sending, by the base station, system information to the terminal, where the system information includes configuration information of the PRACH channel, and the configuration information of the PRACH channel includes information about a type 1 PRACH channel and/or information about a type 2 PRACH channel.

A bandwidth occupied by each type 1 PRACH channel in the frequency domain is 3.75 kHz or 15 kHz, or is greater than 0 and less than 3.75 kHz. The information about the type 1 PRACH channel includes at least one of the following: a quantity of type 1 PRACH channels, time-domain information including specific frames or subframes in which sending is allowed, a quantity of type 1 PRACH channels in the frequency domain, or index or location information of the type 1 PRACH channel in the frequency domain.

A bandwidth occupied by each type 2 PRACH channel in the frequency domain is greater than 15 kHz and less than or equal to 180 kHz. The information about the type 2 PRACH channel includes at least one of the following: a quantity of type 2 PRACH channels, time-domain information including specific frames or subframes in which sending is allowed, a quantity of type 2 PRACH channels in the frequency domain, or index or location information of the type 2 PRACH channel in the frequency domain.

It should be noted that the type 1 PRACH channel and the type 2 PRACH channel may be multiplexed in TDM manner or an FDM manner. That is, when the TDM is used for the type 1 PRACH channel and the type 2 PRACH channel, the system information is used to indicate that time-domain information corresponding to the type 1 PRACH channel and time-domain information corresponding to the type 2 PRACH channel are mutually exclusive, that is, no type 2 PRACH channel is available when the type 1 PRACH channel is available, or no type 1 PRACH channel is available when the type 2 PRACH channel is available. When the FDM is used for the type 1 PRACH channel and the type 2 PRACH channel, the system information is used to indicate that frequency-domain information corresponding to the type 1 PRACH channel and frequency-domain information corresponding to the type 2 PRACH channel are mutually exclusive, that is, no type 2 PRACH channel is available on a frequency on which the type 1 PRACH channel is available, or no type 1 PRACH channel is available on a frequency on which the type 2 PRACH channel is available.

In addition, a time-frequency resource location occupied by the type 1 PRACH channel may be the same as or different from a time-frequency resource location occupied by the type 1 uplink resource. A time-frequency resource location occupied by the type 2 PRACH channel may be the same as or different from a time-frequency resource location occupied by the type 2 uplink resource.

After the base station sends the system information to the terminal, when the terminal supports the type 1 terminal capability and/or the type 2 terminal capability, the terminal sends the random access information to the base station on the type 1 PRACH channel; or when the terminal supports the type 1 terminal capability and/or the type 3 terminal capability, the terminal sends the random access information to the base station on the type 2 PRACH channel.

That is, the PRACH channel includes the type 1 PRACH channel and the type 2 PRACH channel. The type 1 PRACH channel is used to send the random access information when the terminal supports the type 1 terminal capability. The type 2 PRACH channel is used to send the random access information when the terminal supports the type 2 terminal capability and/or the type 3 terminal capability.

The type 1 PRACH channel may be configured by the base station and include a plurality of 3.75 kHz subcarriers or sub-channels or a plurality of 15 kHz subcarriers in the frequency domain. Each PRACH channel occupies one 3.75 kHz subcarrier or sub-channel or one 15 kHz subcarrier in the frequency domain. The type 2 PRACH channel is less than or equal to 180 kHz in the frequency domain, and each PRACH channel occupies 139 subcarriers or subcarriers with a prime-number quantity such as 251 or 571. When 139 subcarriers are occupied, a random preamble or an orthogonal sequence code is sent at a subcarrier spacing of 1.25 kHz; or when 571 subcarriers are occupied, a random preamble or an orthogonal sequence code is sent at a subcarrier spacing of 312.5 Hz. Specifically, a process of sending the random access information on the type 1 PRACH channel and the type 2 PRACH channel is similar to that in method 1, and details are not described again in this embodiment of the present invention.

It should be noted that the terminal may send the random access information to the base station on the type 1 PRACH channel by using either method 1 or method 2, and this is not specifically limited in the present invention. The terminal may send the random access information to the base station on the type 2 PRACH channel by using either method 1 or method 2, or by using a random access code sending format defined in an LTE system, and this is not specifically limited in the present invention.

Correspondingly, the method further includes:

Operation 209: The base station receives the random access information sent on the PRACH by the terminal.

When the terminal sends the random access information to the base station by using method 3, the base station receives the random access information sent on the PRACH by the terminal. Specifically, when the terminal supports the type 1 terminal capability and/or the type 2 terminal capability, the base station receives, on the type 1 PRACH channel, the random access information sent by the terminal; or when the terminal supports the type 3 terminal capability, the terminal receives, on the type 2 PRACH channel, the random access information sent by the terminal.

Figure 10:
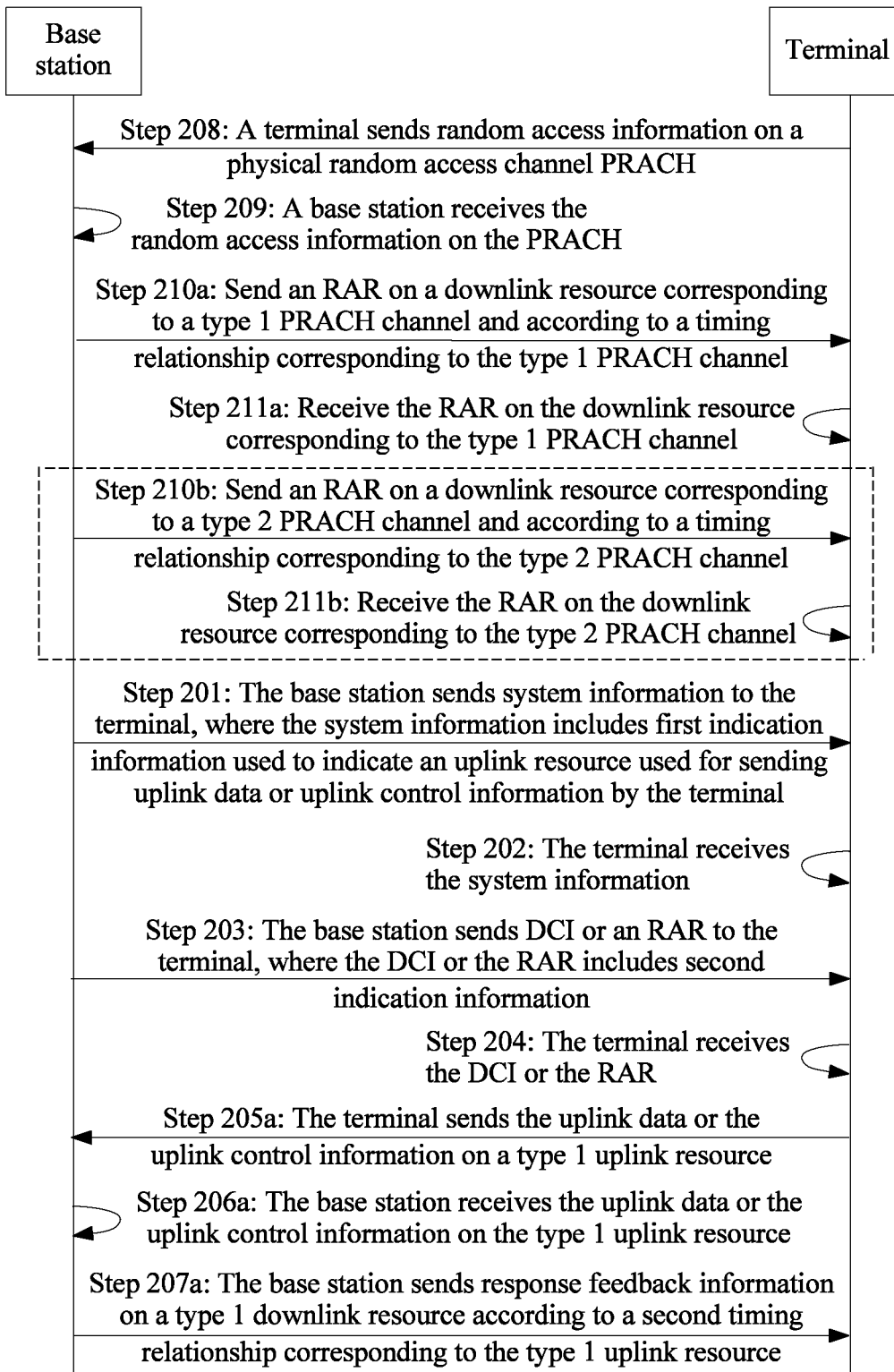
FIG. 10 is a schematic flowchart of a sixth data transmission method according to an embodiment of the present invention.

Further, referring to FIG. 10, when terminal capabilities supported by the terminal are different, after the base station receives the random access information sent by the terminal, the method may differ, and is as follows:

When the terminal supports the type 1 terminal capability and/or the type 2 terminal capability, after the base station receives, on the type 1 PRACH channel, the random access information sent by the terminal, the method further includes:

Operation 210*a*: The base station sends, on a downlink resource corresponding to the type 1 PRACH channel and according to a timing relationship corresponding to the type 1 PRACH channel, an RAR to the terminal.

The timing relationship corresponding to the type 1 PRACH channel is used to indicate a timing relationship between the random access information sent by the terminal and the RAR sent by the base station.

Figure 10A:
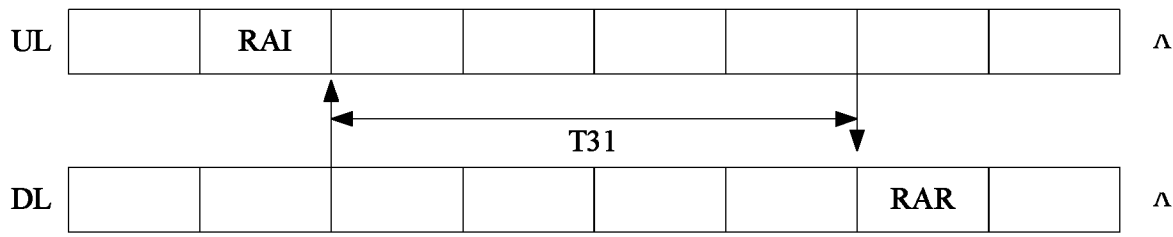
FIG. 10A is a schematic diagram of a timing relationship corresponding to a type 1 PRACH channel according to an embodiment of the present invention.

It should be noted that the timing relationship between the random access information sent by the terminal and the RAR sent by the base station refers to a time difference between a subframe number of an end subframe for sending the random access information by the terminal and a subframe number of a start subframe for sending the RAR by the base station, and a frame quantity, a subframe quantity, a scheduling time interval TTI quantity, or the like is used as a unit. Alternatively, when a plurality of subframes are occupied for sending the random access information by the terminal, the timing relationship may refer to a time difference between a subframe number of a start subframe for sending the random access information by the terminal and a subframe number of a start subframe for sending the RAR by the base station, or refer to a time difference, when the base station correctly receives the random access information sent by the terminal, between a subframe number of a subframe for sending the random access information and a subframe number of a start subframe for sending the RAR by the base station. For example, a time difference T31 between a subframe number of an end subframe for sending the random access information by the terminal and a subframe number of a start subframe for sending the RAR by the base station is used in the present invention, as shown in FIG. 10A. RAI represents the random access information.

In addition, the timing relationship corresponding to the type 1 PRACH channel may be preset, or be included in the system information, and this is not specifically limited in this embodiment of the present invention. Being preset means having been clearly specified in a standard or specification.

Correspondingly, the method further includes:

Operation 211*a*: The terminal receives, on the downlink resource corresponding to the type 1 PRACH channel and according to the timing relationship corresponding to the type 1 PRACH channel, the RAR sent by the base station.

When the terminal supports the type 3 terminal capability, after the base station receives, on the type 2 PRACH channel, the random access information sent by the terminal, the method further includes:

Operation 210*b*: The base station sends, on a downlink resource corresponding to the type 2 PRACH channel and according to a timing relationship corresponding to the type 2 PRACH channel, an RAR to the terminal.

The timing relationship corresponding to the type 2 PRACH channel is used to indicate a timing relationship between the random access information sent by the terminal and the RAR sent by the base station.

Figure 10B:
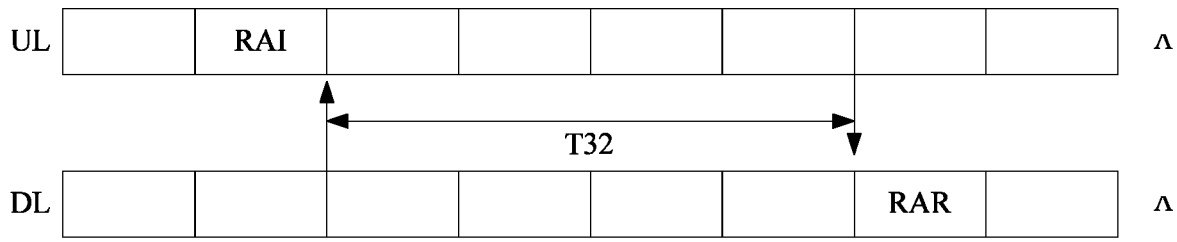
FIG. 10B is a schematic diagram of a timing relationship corresponding to a type 2 PRACH channel according to an embodiment of the present invention.

It should be noted that the timing relationship between the random access information sent by the terminal and the RAR sent by the base station refers to a time difference between a subframe number of an end subframe for sending the random access information by the terminal and a subframe number of a start subframe for sending the RAR by the base station, and a frame quantity, a subframe quantity, a scheduling time interval TTI quantity, or the like is used as a unit. Alternatively, when a plurality of subframes are occupied for sending the random access information by the terminal, the timing relationship may refer to a time difference between a subframe number of a start subframe for sending the random access information by the terminal and a subframe number of a start subframe for sending the RAR by the base station, or refer to a time difference, when the base station correctly receives the random access information sent by the terminal, between a subframe number of a subframe for sending the random access information and a subframe number of a start subframe for sending the RAR by the base station. For example, a time difference T32 between a subframe number of an end subframe for sending the random access information by the terminal and a subframe number of a start subframe for sending the RAR by the base station is used in the present invention, as shown in FIG. 10B.

In addition, the timing relationship corresponding to the type 2 PRACH channel may be preset, or be included in the system information, and this is not specifically limited in this embodiment of the present invention. Being preset means having been clearly specified in a standard or specification.

In addition, the timing relationship T31 corresponding to the type 1 PRACH channel may be the same as or different from the timing relationship T32 corresponding to the type 2 PRACH channel.

Correspondingly, the method further includes:

Operation 211*b*: The terminal receives, on the downlink resource corresponding to the type 2 PRACH channel, the RAR sent by the base station according to the timing relationship corresponding to the type 2 PRACH channel.

It should be noted that the type 1 PRACH channel is corresponding to a downlink resource, and the type 2 PRACH channel is corresponding to a downlink resource. The correspondence herein is a correspondence between types of uplink and downlink resources, and does not represent a correspondence between quantities of uplink and downlink resources. For example, the type 1 downlink resource is one physical resource block PRB, that is, 180 kHz, a bandwith of the type 1 PRACH channel in the frequency domain is 3.75 kHz, and the 180 kHz type 1 downlink resource may be corresponding to at least one type 1 PRACH channel. A specific correspondence may be preset. For example, a correspondence is related to a frequency band used in a system and is clearly specified in a standard or specification, or a correspondence is obtained according to a downlink synchronization signal or a reference signal that is sent by a system, or notification may be provided in system information. This is not limited in this embodiment of the present invention. In addition, the downlink resource corresponding to the type 1 PRACH channel and the downlink resource corresponding to the type 2 PRACH channel may be the same or different in the time domain or in the frequency domain. When the downlink resource corresponding to the type 1 PRACH channel and the downlink resource corresponding to the type 2 PRACH channel are the same in the time domain and in the frequency domain, the downlink resource corresponding to the type 1 PRACH channel and the downlink resource corresponding to the type 2 PRACH channel indicate a same downlink resource. In this case, the same downlink resource may be corresponding to both the type 1 PRACH channel and the type 2 PRACH channel. When the downlink resource corresponding to the type 1 PRACH channel and the downlink resource corresponding to the type 2 PRACH channel may be different in the time domain, or in the frequency domain, or in both the time domain and the frequency domain, that the downlink resources are different in the time domain includes at least one of the following: different time startpoints, different periods, or different duration, and that the downlink resources are different in the frequency domain includes at least one of the following: different occupied frequency ranges, different occupied frequency startpoints, different quantities of occupied subcarriers, or the like. In addition, orthogonal frequency division multiplexing OFDM symbols are transmitted on both the downlink resource corresponding to the type 1 PRACH channel and the downlink resource corresponding to the type 2 PRACH channel, and a subcarrier spacing is 15 kHz.

In addition, a sequence of performing the two groups of operations, that is, operation 210*a* and operation 211*a*, and operation 210*b* and operation 211*b*, is not limited, and the two groups of operations are parallel. Specifically, which group of operations is performed by the base station and the terminal depends on a terminal capability supported by the terminal.

According to the data transmission method provided in this embodiment of the present invention, the base station sends the system information to the terminal, where the system information includes the first indication information used to indicate the uplink resource used for sending the uplink data or the uplink control information by the terminal, and the first indication information includes the information used to indicate whether the uplink resource is the type 1 uplink resource or the type 2 uplink resource, and the time-domain information and/or the frequency-domain information of the type 1 uplink resource or the type 2 uplink resource; and then, the terminal obtains the first indication information of the uplink resource used for sending the uplink data or the uplink control information, sends, based on the first indication information, uplink and downlink data sent and received on corresponding uplink and downlink resources, and implements random access of the terminal. In this way, based on an existing LTE system, the base station can perform uplink and downlink data transmission with the terminal that supports any one, two, or three of the type 1 terminal capability, the type 2 terminal capability, or the type 3 terminal capability. This improves utilization of the LTE system and the base station.

Figure 11:
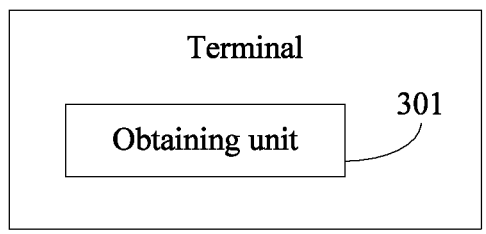
FIG. 11 is a schematic structural diagram of a terminal according to an embodiment of the present invention.

As shown in FIG. 11, an embodiment of the present invention provides a terminal. The terminal is configured to perform the operations performed by the terminal in the foregoing method. The terminal may include modules corresponding to corresponding operations, and for example, may include:

an obtaining unit 301, configured to obtain first indication information of an uplink resource used for sending uplink data or uplink control information.

The first indication information of the uplink resource includes information used to indicate whether the uplink resource is a type 1 uplink resource or a type 2 uplink resource. The type 1 uplink resource includes at least one subcarrier in a frequency domain and at least one SC-FDMA symbol in a time domain, where when a subcarrier quantity is greater than or equal to 2, subcarriers are orthogonal to each other, and a subcarrier spacing is 3.75 kHz; or the type 1 uplink resource includes at least one sub-channel in a frequency domain and at least one FDMA symbol in a time domain, where a bandwith of each sub-channel is approximately 3.75 kHz. The type 2 uplink resource includes at least one subcarrier in the frequency domain and at least one SC-FDMA symbol in the time domain, where when a subcarrier quantity is greater than or equal to 2, subcarriers are orthogonal to each other, and a subcarrier spacing is 15 kHz.

The first indication information of the uplink resource further includes time-domain information and/or frequency-domain information of the type 1 uplink resource or the type 2 uplink resource.

Optionally, the obtaining unit 301 may be configured to:

receive system information sent by a base station, where the system information includes the time-domain information and/or the frequency-domain information of the type 1 uplink resource, and/or the time-domain information and/or the frequency-domain information of the type 2 uplink resource.

Optionally, if the terminal supports a type 1 terminal capability, the first indication information is used to indicate that the uplink resource is the type 1 uplink resource;

if the terminal supports a type 2 terminal capability or a type 3 terminal capability, the first indication information is used to indicate that the uplink resource is the type 2 uplink resource; or if the terminal supports a type 1 terminal capability and a type 2 terminal capability, or the terminal supports a type 1 terminal capability and a type 3 terminal capability, the first indication information is used to indicate that the uplink resource is the type 1 uplink resource or the type 2 uplink resource.

Figure 12:
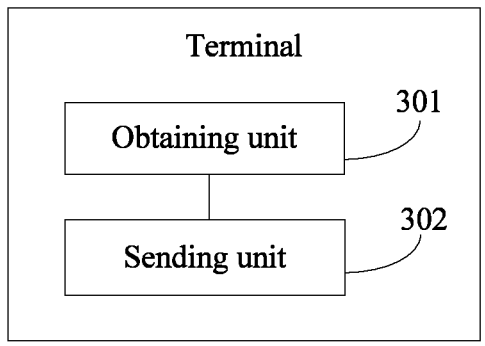
FIG. 12 is a schematic structural diagram of another terminal according to an embodiment of the present invention.

Optionally, referring to FIG. 12, the terminal further includes:

a sending unit 302, configured to: if the terminal supports the type 1 terminal capability, send the uplink data or the uplink control information on the type 1 uplink resource;

if the terminal supports the type 2 terminal capability or the type 3 terminal capability, send the uplink data or the uplink control information on the type 2 uplink resource; or if the terminal supports the type 1 terminal capability and the type 2 terminal capability, or the terminal supports the type 1 terminal capability and the type 3 terminal capability, send the uplink data or the uplink control information on the type 1 uplink resource or the type 2 uplink resource.

In another embodiment of the present invention, the obtaining unit 301 is further configured to obtain second indication information of the uplink resource used for sending the uplink data. The second indication information includes subcarrier information or sub-channel information of the type 1 uplink resource or the type 2 uplink resource used for sending the uplink data by the terminal.

The subcarrier information includes at least one of the following: a subcarrier quantity, a subcarrier index, or information used to indicate a location or an index of a subcarrier in the frequency domain.

The sub-channel information includes at least one of the following: a sub-channel quantity, a sub-channel index, or information used to indicate a location or an index of a sub-channel in the frequency domain.

In another embodiment of the present invention, the obtaining unit 301 may be configured to:

receive downlink control information DCI or a random access response RAR sent by the base station, where the DCI or the RAR includes the second indication information.

In another embodiment of the present invention, the sending unit 302 may be configured to:

if the terminal supports the type 1 terminal capability, send the uplink data on the type 1 uplink resource;

if the terminal supports the type 2 terminal capability or the type 3 terminal capability, send the uplink data on the type 2 uplink resource; or if the terminal supports the type 1 terminal capability and the type 2 terminal capability, or the terminal supports the type 1 terminal capability and the type 3 terminal capability, send the uplink data on the type 1 uplink resource or the type 2 uplink resource.

In another embodiment of the present invention, the sending unit 302 is further configured to:

send, on the type 1 uplink resource according to a first timing relationship corresponding to the type 1 uplink resource, the uplink data scheduled by using scheduling information, where the first timing relationship corresponding to the type 1 uplink resource is used to indicate a timing relationship between the scheduling information included in the DCI or the RAR and the uplink data scheduled by using the scheduling information.

Correspondingly, the obtaining unit 301 is further configured to: after the sending unit 302 sends the uplink data scheduled by using the scheduling information, receive, on the type 1 downlink resource according to a second timing relationship corresponding to the type 1 uplink resource, response feedback information sent by the base station. The second timing relationship corresponding to the type 1 uplink resource is used to indicate a timing relationship between the uplink data sent by the terminal and the response feedback information corresponding to the uplink data.

In another embodiment of the present invention, the sending unit 302 is further configured to:

send, on the type 2 uplink resource according to a first timing relationship corresponding to the type 2 uplink resource, the uplink data scheduled by using scheduling information, where the first timing relationship corresponding to the type 2 uplink resource is used to indicate a timing relationship between the scheduling information included in the DCI or the RAR and the uplink data scheduled by using the scheduling information.

Correspondingly, the obtaining unit 301 is further configured to: after the sending unit 302 sends the uplink data scheduled by using the scheduling information, receive, on the type 2 downlink resource according to a second timing relationship corresponding to the type 2 uplink resource, response feedback information sent by the base station. The second timing relationship corresponding to the type 2 uplink resource is used to indicate a timing relationship between the uplink data sent by the terminal and the response feedback information corresponding to the uplink data.

In another embodiment of the present invention, the obtaining unit 301 is further configured to:

when the terminal supports the type 1 terminal capability, detect the DCI or the RAR on the type 1 downlink resource, where the DCI or the RAR further includes the scheduling information used to schedule the terminal to send the uplink data;

when the terminal supports the type 2 terminal capability and the type 3 terminal capability, detect the DCI or the RAR on the type 2 downlink resource, where the DCI or the RAR includes the scheduling information used to schedule the terminal to send the uplink data; or when the terminal supports the type 1 terminal capability and the type 2 terminal capability, or the terminal supports the type 1 terminal capability and the type 3 terminal capability, detect the DCI or the RAR on the type 1 downlink resource and/or the type 2 downlink resource, where the DCI or the RAR includes the scheduling information used to schedule the terminal to send the uplink data.

Optionally, when the terminal supports the type 1 terminal capability and the type 2 terminal capability, or the terminal supports the type 1 terminal capability and the type 3 terminal capability, the DCI or the RAR further includes third indication information used to indicate whether the uplink resource used for sending the uplink data by the terminal is the type 1 uplink resource or the type 2 uplink resource.

Specifically, if the received DCI is in a first DCI format, the third indication information indicates subcarrier information or sub-channel information of the type 1 uplink resource used for sending the uplink data by the terminal; or if the received DCI is in a second DCI format, the third indication information indicates subcarrier information or sub-channel information of the type 2 uplink resource used for sending the uplink data by the terminal; or if CRC in the DCI is scrambled by using a first scrambling code, the third indication information indicates subcarrier information or sub-channel information of the type 1 uplink resource used for sending the uplink data by the terminal; or if the CRC in the DCI is scrambled by using a second scrambling code, the third indication information indicates subcarrier information or sub-channel information of the type 2 uplink resource used for sending the uplink data by the terminal.

In another embodiment of the present invention, the sending unit 302 is further configured to send random access information on a PRACH. A bandwidth occupied by each PRACH channel in the frequency domain is approximately 3.75 kHz or 15 kHz, or is greater than 15 kHz and less than or equal to 180 kHz, and the random access information is a random preamble, an orthogonal sequence code, or a modulation symbol.

Optionally, the obtaining unit 301 is further configured to receive system information sent by the base station. The system information includes configuration information of the PRACH channel, and the configuration information of the PRACH channel includes information about a type 1 PRACH channel and/or information about a type 2 PRACH channel.

A bandwidth occupied by each type 1 PRACH channel in the frequency domain is 3.75 kHz or 15 kHz, and the information about the type 1 PRACH channel includes at least one of the following: a quantity of type 1 PRACH channels in the frequency domain, or index or location information of the type 1 PRACH channel in the frequency domain.

A bandwidth occupied by each type 2 PRACH channel in the frequency domain is greater than 15 kHz and less than or equal to 180 kHz, and the information about the type 2 PRACH channel includes at least one of the following: a quantity of type 2 PRACH channels in the frequency domain, or index or location information of the type 2 PRACH channel in the frequency domain.

In another embodiment of the present invention, the sending unit 302 is configured to:

send a randomly selected random preamble to the base station on a randomly selected PRACH channel at each random access information sending opportunity; or send a random preamble to the base station at n times, where a PRACH channel is occupied at each random access information sending opportunity, to send a segment of the random preamble, and n is an integer greater than or equal to 1.

In another embodiment of the present invention, the sending unit 302 is configured to:

when the terminal supports the type 1 terminal capability and/or the type 2 terminal capability, send the random access information to the base station on the type 1 PRACH channel; or when the terminal supports the type 1 terminal capability and/or the type 3 terminal capability, send the random access information to the base station on the type 2 PRACH channel.

Further, when the terminal supports the type 1 terminal capability and/or the type 2 terminal capability, the obtaining unit 301 is further configured to receive, on a downlink resource corresponding to the type 1 PRACH channel and according to a timing relationship corresponding to the type 1 PRACH channel, the RAR sent by the base station. The timing relationship corresponding to the type 1 PRACH channel is used to indicate a timing relationship between the random access information sent by the terminal and the RAR sent by the base station.

Correspondingly, when the terminal supports the type 1 terminal capability and/or the type 3 terminal capability, the obtaining unit 301 is further configured to receive, on a downlink resource corresponding to the type 2 PRACH channel and according to a timing relationship corresponding to the type 2 PRACH channel, the RAR sent by the base station. The timing relationship corresponding to the type 2 PRACH channel is used to indicate a timing relationship between the random access information sent by the terminal and the RAR sent by the base station.

According to the terminal provided in this embodiment of the present invention, the terminal obtains the first indication information of the uplink resource used for sending the uplink data or the uplink control information, where the first indication information includes the information used to indicate whether the uplink resource is the type 1 uplink resource or the type 2 uplink resource, and the time-domain information and/or the frequency-domain information of the type 1 uplink resource or the type 2 uplink resource; and then, the terminal sends, based on the first indication information, uplink and downlink data sent and received on corresponding uplink and downlink resources. In this way, based on an existing LTE system, the base station can perform uplink and downlink data transmission with the terminal that supports any one, two, or three of the type 1 terminal capability, the type 2 terminal capability, or the type 3 terminal capability. This improves utilization of the LTE system and the base station.

Figure 13:
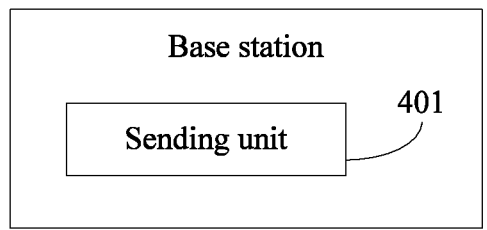
FIG. 13 is a schematic structural diagram of a base station according to an embodiment of the present invention.

As shown in FIG. 13, an embodiment of the present invention provides a base station. The base station is configured to perform the operations performed by the base station in the foregoing method. The base station may include modules corresponding to corresponding operations, and for example, includes:

a sending unit 401, configured to send system information to a terminal, where the system information includes first indication information used to indicate an uplink resource used for sending uplink data or uplink control information by the terminal.

The first indication information of the uplink resource includes information used to indicate whether the uplink resource is a type 1 uplink resource or a type 2 uplink resource. The type 1 uplink resource includes at least one subcarrier in a frequency domain and at least one SC-FDMA symbol in a time domain, where when a subcarrier quantity is greater than or equal to 2, subcarriers are orthogonal to each other, and a subcarrier spacing is 3.75 kHz; or the type 1 uplink resource includes at least one sub-channel in a frequency domain and at least one FDMA symbol in a time domain, where a bandwith of each sub-channel is 3.75 kHz. The type 2 uplink resource includes at least one subcarrier in the frequency domain and at least one SC-FDMA symbol in the time domain, where when a subcarrier quantity is greater than or equal to 2, subcarriers are orthogonal to each other, and a subcarrier spacing is 15 kHz.

The first indication information of the uplink resource further includes time-domain information and/or frequency-domain information of the type 1 uplink resource or the type 2 uplink resource.

Optionally, if the terminal supports a type 1 terminal capability, the first indication information is used to indicate that the uplink resource is the type 1 uplink resource;

if the terminal supports a type 2 terminal capability or a type 3 terminal capability, the first indication information is used to indicate that the uplink resource is the type 2 uplink resource; or if the terminal supports a type 1 terminal capability and a type 2 terminal capability, or the terminal supports a type 1 terminal capability and a type 3 terminal capability, the first indication information is used to indicate that the uplink resource is the type 1 uplink resource or the type 2 uplink resource.

In another embodiment of the present invention, the sending unit 401 is further configured to send DCI or an RAR to the terminal. The DCI or the RAR includes second indication information used to indicate the uplink resource used for sending the uplink data by the terminal.

The second indication information includes subcarrier information or sub-channel information of the type 1 uplink resource or the type 2 uplink resource used for sending the uplink data by the terminal.

The subcarrier information includes at least one of the following: a subcarrier quantity, a subcarrier index, or information used to indicate a location or an index of a subcarrier in the frequency domain.

The sub-channel information includes at least one of the following: a sub-channel quantity, a sub-channel index, or information used to indicate a location or an index of a sub-channel in the frequency domain.

In another embodiment of the present invention, the receiving unit 402 is further configured to receive, on the type 1 uplink resource, the uplink data sent on the type 1 uplink resource by the terminal that supports the type 1 terminal capability; or receive, on the type 2 uplink resource, the uplink data sent on the type 2 uplink resource by the terminal that supports the type 2 terminal capability or the type 3 terminal capability; or receive, on the type 1 uplink resource, the uplink data sent on the type 1 uplink resource by the terminal that supports the type 1 terminal capability and the type 2 terminal capability; or receive, on the type 2 uplink resource, the uplink data sent on the type 2 uplink resource by the terminal that supports the type 1 terminal capability and the type 2 terminal capability.

Figure 14:
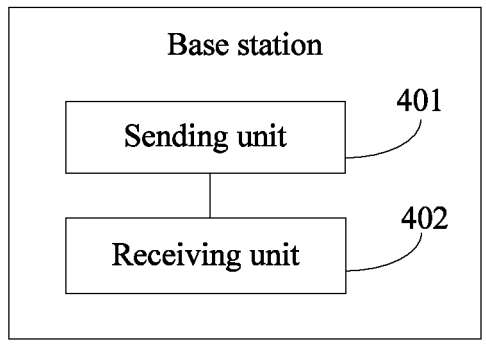
FIG. 14 is a schematic structural diagram of another base station according to an embodiment of the present invention.

Further, referring to FIG. 14, the receiving unit 402 is further configured to:

receive, on the type 1 uplink resource according to a first timing relationship corresponding to the type 1 uplink resource, the uplink data that is scheduled by using scheduling information and that is sent by the terminal, where the first timing relationship corresponding to the type 1 uplink resource is used to indicate a timing relationship between the scheduling information included in the DCI or the RAR and the uplink data scheduled by using the scheduling information.

Correspondingly, the sending unit 401 is further configured to: after the uplink data that is scheduled by using the scheduling information and that is sent by the terminal is received on the type 1 uplink resource, send, on the type 1 downlink resource according to a second timing relationship corresponding to the type 1 uplink resource, response feedback information to the terminal. The second timing relationship corresponding to the type 1 uplink resource is used to indicate a timing relationship between the uplink data sent by the terminal and the response feedback information corresponding to the uplink data.

In another embodiment of the present invention, the receiving unit 401 is further configured to:

receive, on the type 2 uplink resource according to a first timing relationship corresponding to the type 2 uplink resource, the uplink data that is scheduled by using scheduling information and that is sent by the terminal, where the first timing relationship corresponding to the type 2 uplink resource is used to indicate a timing relationship between the scheduling information included in the DCI or the RAR and the uplink data scheduled by using the scheduling information.

Correspondingly, the sending unit 402 is further configured to: after the uplink data that is scheduled by using the scheduling information and that is sent by the terminal is received on the type 2 uplink resource, send, on the type 2 downlink resource according to a second timing relationship corresponding to the type 2 uplink resource, response feedback information to the terminal. The second timing relationship corresponding to the type 2 uplink resource is used to indicate a timing relationship between the uplink data sent by the terminal and the response feedback information corresponding to the uplink data.

Further, the sending unit 402 is further configured to:

when the terminal supports the type 1 terminal capability, send the DCI or the RAR on the type 1 downlink resource, where the DCI or the RAR further includes the scheduling information used to schedule the terminal to send the uplink data;

when the terminal supports the type 2 terminal capability and the type 3 terminal capability, send the DCI or the RAR on the type 2 downlink resource, where the DCI or the RAR includes the scheduling information used to schedule the terminal to send the uplink data; or when the terminal supports the type 1 terminal capability and the type 2 terminal capability, or the terminal supports the type 1 terminal capability and the type 3 terminal capability, send the DCI or the RAR on the type 1 downlink resource and/or the type 2 downlink resource, where the DCI or the RAR includes the scheduling information used to schedule the terminal to send the uplink data.

In another embodiment of the present invention, when the DCI or the RAR includes the second indication information, and the terminal supports the type 1 terminal capability and the type 2 terminal capability or the terminal supports the type 1 terminal capability and the type 3 terminal capability, the DCI or the RAR further includes third indication information used to indicate whether the uplink resource used for sending the uplink data by the terminal is the type 1 uplink resource or the type 2 uplink resource.

Specifically, if the DCI is in a first DCI format, the third indication information indicates subcarrier information or sub-channel information of the type 1 uplink resource used for sending the uplink data by the terminal; or if the DCI is in a second DCI format, the third indication information indicates subcarrier information or sub-channel information of the type 2 uplink resource used for sending the uplink data by the terminal; or if CRC in the DCI is scrambled by using a first scrambling code, the third indication information indicates subcarrier information or sub-channel information of the type 1 uplink resource used for sending the uplink data by the terminal; or if the CRC in the DCI is scrambled by using a second scrambling code, the third indication information indicates subcarrier information or sub-channel information of the type 2 uplink resource used for sending the uplink data by the terminal.

In another embodiment of the present invention, the receiving unit 401 is further configured to receive random access information sent on a physical random access channel PRACH by the terminal. A bandwidth occupied by each PRACH channel in the frequency domain is 3.75 kHz or 15 kHz, or is greater than 15 kHz and less than or equal to 180 kHz, and the random access information is a random preamble, an orthogonal sequence code, or a modulation symbol.

In another embodiment of the present invention, the sending unit 401 is further configured to send system information to the terminal. The system information includes configuration information of the PRACH channel, and the configuration information of the PRACH channel includes information about a type 1 PRACH channel and/or information about a type 2 PRACH channel.

A bandwidth occupied by each type 1 PRACH channel in the frequency domain is 3.75 kHz or 15 kHz, and the information about the type 1 PRACH channel includes at least one of the following: a quantity of type 1 PRACH channels in the frequency domain, or index or location information of the type 1 PRACH channel in the frequency domain.

A bandwidth occupied by each type 2 PRACH channel in the frequency domain is greater than 15 kHz and less than or equal to 180 kHz, and the information about the type 2 PRACH channel includes at least one of the following: a quantity of type 2 PRACH channels in the frequency domain, or index or location information of the type 2 PRACH channel in the frequency domain.

In another embodiment of the present invention, the receiving unit 402 is configured to:

receive a randomly selected random preamble sent by the terminal on a randomly selected PRACH channel at each random access information sending opportunity; or receive a random preamble sent by the terminal at n times, where the terminal occupies a PRACH channel at each random access information sending opportunity, to send a segment of the random preamble, and n is an integer greater than or equal to 1.

In another embodiment of the present invention, the receiving unit 402 is further configured to:

when the terminal supports the type 1 terminal capability and/or the type 2 terminal capability, receive, on the type 1 PRACH channel, the random access information sent by the terminal; or when the terminal supports the type 3 terminal capability, receive, on the type 2 PRACH channel, the random access information sent by the terminal.

In another embodiment of the present invention, the sending unit 401 is further configured to send, on a downlink resource corresponding to the type 1 PRACH channel and according to a timing relationship corresponding to the type 1 PRACH channel, the RAR to the terminal. The timing relationship corresponding to the type 1 PRACH channel is used to indicate a timing relationship between the random access information sent by the terminal and the RAR sent by the base station.

Correspondingly, the sending unit 401 is further configured to send, on a downlink resource corresponding to the type 2 PRACH channel and according to a timing relationship corresponding to the type 2 PRACH channel, the RAR to the terminal. The timing relationship corresponding to the type 2 PRACH channel is used to indicate a timing relationship between the random access information sent by the terminal and the RAR sent by the base station.

According to the base station provided in this embodiment of the present invention, the base station sends the system information to the terminal, where the system information includes the first indication information used to indicate the uplink resource used for sending the uplink data or the uplink control information by the terminal, and the first indication information includes the information used to indicate whether the uplink resource is the type 1 uplink resource or the type 2 uplink resource, and the time-domain information and/or the frequency-domain information of the type 1 uplink resource or the type 2 uplink resource; and then, the terminal obtains the first indication information of the uplink resource used for sending the uplink data or the uplink control information, and sends, based on the first indication information, uplink and downlink data sent and received on corresponding uplink and downlink resources. In this way, based on an existing LTE system, the base station can perform uplink and downlink data transmission with the terminal that supports any one, two, or three of the type 1 terminal capability, the type 2 terminal capability, or the type 3 terminal capability. This improves utilization of the LTE system and the base station.

Figure 15:
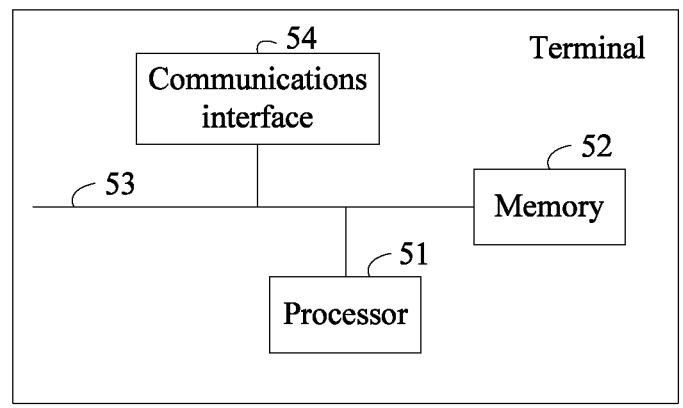
FIG. 15 is a schematic structural diagram of still another terminal according to an embodiment of the present invention.

FIG. 15 is a schematic structural diagram of a terminal according to an embodiment of the present invention. As shown in FIG. 15, the terminal includes a processor 51, a memory 52, a system bus 53, and a communications interface 54.

Persons of ordinary skill in the art can understand that a structure shown in FIG. 15 is merely an example, and is not construed as limitation on the structure of the terminal. For example, the terminal may alternatively include more or fewer components than those shown in FIG. 15, or may have a configuration different from that shown in FIG. 15.

The following describes each constituent part of the terminal in detail.

The memory 52 is configured to store a computer executable instruction, the processor 51 is connected to the memory 52 by using the system bus 53, and when the terminal runs, the processor 51 executes the computer executable instruction stored in the memory 52, so that the terminal performs the operations performed by the terminal in the method process shown in any one of FIG. 2, FIG. 3, FIG. 4, FIG. 5, FIG. 6, or FIG. 10. For a specific method, refer to related descriptions of the embodiment in any one of FIG. 2, FIG. 3, FIG. 4, FIG. 5, FIG. 6, or FIG. 10. Details are not described herein again.

This embodiment further provides a storage medium. The storage medium may include the memory 52.

The processor 51 may be a central processing unit (CPU). Alternatively, the processor 51 may be another general purpose processor, a digital signal processor (DSP), an application-specific integrated circuit (ASIC), a field-programmable gate array (FPGA) or another programmable logic device, a discrete gate or a transistor logic device, a discrete hardware assembly, or the like. The general purpose processor may be a microprocessor, or the processor may be any conventional processor or the like.

The processor 51 may be a dedicated processor. The dedicated processor may include at least one of a baseband processing chip, a radio frequency processing chip, or the like. Further, the dedicated processor may further include a chip having another dedicated processing function of the terminal.

The memory 52 may include a volatile memory (volatile memory), such as a random access memory (RAM); or the memory 52 may include a non-volatile memory (non-volatile memory), such as a read-only memory (read-only memory, ROM), a flash memory, a hard disk drive HDD), or a solid-state drive (SSD); or the memory 52 may include a combination of the foregoing types of memories.

The system bus 53 may include a data bus, a power bus, a control bus, a signal status bus, and the like. For clear description in this embodiment, various buses in FIG. 22 are marked as the system bus 53.

The communications interface 54 may be a transceiver on the terminal. The transceiver may be a radio transceiver. For example, the radio transceiver may be an antenna or the like of the terminal. The processor 51 receives data from or sends data to another device such as a base station by using the communications interface 54.

In a specific implementation process, all the operations performed by the terminal in the method process shown in any one of FIG. 2, FIG. 3, FIG. 4, FIG. 5, FIG. 6, or FIG. 10 may be implemented by executing, by the processor 51 in a hardware form, a computer executable instruction in a software form that is stored in the memory 52. To avoid repetition, details are not described herein again.

According to the terminal provided in this embodiment of the present invention, the terminal obtains first indication information of an uplink resource used for sending uplink data or uplink control information, where the first indication information includes information used to indicate whether the uplink resource is a type 1 uplink resource or a type 2 uplink resource, and time-domain information and/or frequency-domain information of the type 1 uplink resource or the type 2 uplink resource; and then, the terminal sends, based on the first indication information, uplink and downlink data sent and received on corresponding uplink and downlink resources. In this way, based on an existing LTE system, a base station can perform uplink and downlink data transmission with a terminal that supports any one, two, or three of a type 1 terminal capability, a type 2 terminal capability, or a type 3 terminal capability. This improves utilization of the LTE system and the base station.

Figure 16:
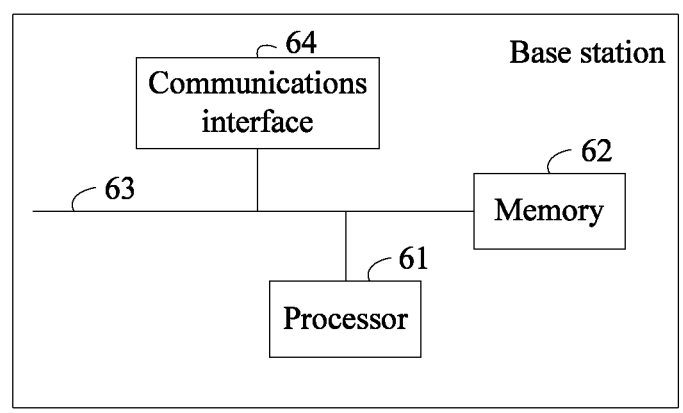
FIG. 16 is a schematic structural diagram of still another base station according to an embodiment of the present invention.

FIG. 16 is a schematic structural diagram of a base station according to an embodiment of the present invention. Referring to FIG. 16, the base station includes a processor 61, a memory 62, a system bus 63, and a communications interface 64.

Persons of ordinary skill in the art can understand that a structure shown in FIG. 16 is merely an example, and is not construed as limitation on the structure of the base station. For example, the base station may alternatively include more or fewer components than those shown in FIG. 16, or may have a configuration different from that shown in FIG. 16.

The following describes each constituent part of the base station in detail.

The memory 62 is configured to store a computer executable instruction, the processor 61 is connected to the memory 62 by using the system bus 63, and when the base station runs, the processor 61 executes the computer executable instruction stored in the memory 62, so that the base station performs the operations performed by the base station in the method shown in any one of FIG. 2, FIG. 3, FIG. 4, FIG. 5, FIG. 6, or FIG. 10. For a specific method, refer to related descriptions of the embodiment in any one of FIG. 2, FIG. 3, FIG. 4, FIG. 5, FIG. 6, or FIG. 10. Details are not described herein again.

This embodiment further provides a storage medium. The storage medium may include the memory 62.

The processor 61 may be a CPU. Alternatively, the processor 61 may be another general purpose processor, a DSP, an ASIC, an FPGA or another programmable logic device, a discrete gate or transistor logic device, a discrete hardware assembly, or the like. The general purpose processor may be a microprocessor, or the processor may be any conventional processor or the like.

The processor 61 may be a dedicated processor. The dedicated processor may include at least one of a baseband processing chip, a radio frequency processing chip, or the like. Further, the dedicated processor may further include a chip having another dedicated processing function of the base station.

The memory 62 may include a volatile memory, for example, a random access memory RAM; or the memory 62 may include a non-volatile memory, for example, a read-only memory ROM, a flash memory, an HDD, or an SSD; or the memory 62 may include a combination of the foregoing types of memories.

The system bus 63 may include a data bus, a power bus, a control bus, a signal status bus, and the like. For clear description in this embodiment, various buses in FIG. 23 are marked as the system bus 63.

The communications interface 64 may be a transceiver on the base station. The transceiver may be a radio transceiver. For example, the radio transceiver may be an antenna or the like of the base station. The processor 61 receives data from or sends data to another device, such as a terminal, by using the communications interface 64.

In a specific implementation process, all the operations performed by the base station in the method process shown in any one of FIG. 2, FIG. 3, FIG. 4, FIG. 5, FIG. 6, or FIG. 10 may be implemented by executing, by the processor 61 in a hardware form, a computer executable instruction in a software form that is stored in the memory 62. To avoid repetition, details are not described herein again.

According to the base station provided in this embodiment of the present invention, the base station sends system information to a terminal, where the system information includes first indication information used to indicate an uplink resource used for sending uplink data or uplink control information by the terminal, and the first indication information includes information used to indicate whether the uplink resource is a type 1 uplink resource or a type 2 uplink resource, and time-domain information and/or frequency-domain information of the type 1 uplink resource or the type 2 uplink resource; and then, the terminal obtains the first indication information of the uplink resource used for sending the uplink data or the uplink control information, and sends, based on the first indication information, uplink and downlink data sent and received on corresponding uplink and downlink resources. In this way, based on an existing LTE system, the base station can perform uplink and downlink data transmission with a terminal that supports any one, two, or three of a type 1 terminal capability, a type 2 terminal capability, or a type 3 terminal capability. This improves utilization of the LTE system and the base station.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data transmission method, comprising:
    obtaining, by a terminal, first indication information of an uplink resource used for sending uplink data or uplink control information, wherein,
    the first indication information of the uplink resource comprises information to indicate whether the uplink resource is a type 1 uplink resource or a type 2 uplink resource;
    the type 1 uplink resource comprises subcarriers in a frequency domain and single-carrier frequency division multiple access (SC-FDMA) symbols in a time domain, wherein the subcarriers are orthogonal to each other, and a subcarrier spacing is approximately 3.75 kHz; and the type 2 uplink resource comprises subcarriers in the frequency domain and SC-FDMA symbols in the time domain, wherein the subcarriers are orthogonal to each other, and a subcarrier spacing is approximately 15 kHz; and
    the first indication information of the uplink resource further comprises time-domain information and/or frequency-domain information of the type 1 uplink resource or the type 2 uplink resource; and
    in response to the uplink resource being a type 1 uplink resource, sending, by the terminal, on the type 1 uplink resource according to a first timing relationship corresponding to the type 1 uplink resource, the uplink data to a base station, the uplink data being scheduled by first scheduling information, wherein the first timing relationship corresponding to the type 1 uplink resource indicates a timing relationship between the first scheduling information and the uplink data.

2. The method according to claim 1, wherein the obtaining, by a terminal, first indication information of an uplink resource used for sending uplink data or uplink control information comprises:
    receiving, by the terminal, system information from the base station, wherein the system information comprises the time-domain information and/or the frequency-domain information of the type 1 uplink resource, and/or the time-domain information and/or the frequency-domain information of the type 2 uplink resource.

3. The method according to claim 1, wherein:
    the terminal supports a type 1 terminal capability.

4. The method according to claim 1, wherein the method further comprises:
    in response to the uplink resource being a type 2 uplink resource, sending, by the terminal, on the type 2 uplink resource according to a second timing relationship corresponding to the type 2 uplink resource, the uplink data being scheduled by second scheduling information, wherein the second timing relationship corresponding to the type 1 uplink resource indicates a timing relationship between the second scheduling information and the uplink data; and
    the terminal supports the type 2 terminal capability.

5. The method according to claim 1, further comprising:
    obtaining, by the terminal, second indication information of the uplink resource used for sending the uplink data, wherein the second indication information comprises subcarrier information of the type 1 uplink resource or the type 2 uplink resource used for sending the uplink data by the terminal;
    the subcarrier information comprises at least one of the following: a subcarrier quantity, a subcarrier index, or information indicating a location or an index of a subcarrier in the frequency domain; and
    wherein the second indication information further comprises first scheduling information.

6. The method according to claim 5, wherein the obtaining, by the terminal, second indication information of the uplink resource used for sending the uplink data comprises:
    receiving, by the terminal, downlink control information (DCI) or a random access response (RAR) from the base station, wherein the DCI or the RAR comprises the second indication information.

7. The method according to claim 1, further comprising:
    receiving, by the terminal, on a type 1 downlink resource according to a second timing relationship corresponding to the type 1 uplink resource, response feedback information corresponding to the uplink data from the base station, wherein the second timing relationship corresponding to the type 1 uplink resource indicates a timing relationship between the uplink data and the response feedback information.

8. A data transmission method, comprising:
    sending, by a base station, first indication information indicating an uplink resource used for sending uplink data or uplink control information by a terminal, to the terminal, wherein,
    the first indication information of the uplink resource comprises information to indicate whether the uplink resource is a type 1 uplink resource or a type 2 uplink resource;
    the type 1 uplink resource comprises subcarriers in a frequency domain and single-carrier frequency division multiple access (SC-FDMA) symbols in a time domain, wherein the subcarriers are orthogonal to each other, and a subcarrier spacing is approximately 3.75 kHz; and the type 2 uplink resource comprises subcarrier in the frequency domain and SC-FDMA symbols in the time domain, wherein the subcarriers are orthogonal to each other, and a subcarrier spacing is approximately 15 kHz; and the first indication information of the uplink resource further comprises time-domain information and/or frequency-domain information of the type 1 uplink resource or the type 2 uplink resource; and in response to the uplink resource being a type 1 uplink resource, receiving, by the base station, on the type 1 uplink resource according to a first timing relationship corresponding to the type 1 uplink resource, the uplink data from the terminal, the uplink data being scheduled by first scheduling information and sent by the terminal, wherein the first timing relationship corresponding to the type 1 uplink resource indicates a timing relationship between the first scheduling information and the uplink data.

9. The method according to claim 8, wherein:
the terminal supports a type 1 terminal capability.

10. The method according to claim 8, further comprising:
sending, by the base station, downlink control information (DCI) or a random access response (RAR) to the terminal, wherein the DCI or the RAR comprises second indication information indicating the uplink resource used for sending the uplink data by the terminal;
the second indication information comprises subcarrier information of the type 1 uplink resource or the type 2 uplink resource used for sending the uplink data by the terminal;
the subcarrier information comprises at least one of the following: a subcarrier quantity, a subcarrier index, or information indicating a location or an index of a subcarrier in the frequency domain.

11. The method according to claim 10, wherein the DCI or the RAR further comprises the scheduling information.

12. The method according to claim 8, further comprising:
sending, by the base station on the type 1 downlink resource according to a second timing relationship corresponding to the type 1 uplink resource, response feedback information corresponding to the uplink data to the terminal, wherein the second timing relationship corresponding to the type 1 uplink resource indicates a timing relationship between the uplink data and the response feedback information.

13. The method according to claim 8, further comprising:
in response to the uplink resource being a type 2 uplink resource, receiving from the terminal, by the base station on the type 2 uplink resource according to a third timing relationship corresponding to the type 2 uplink resource, the uplink data being scheduled by second scheduling information, wherein the third timing relationship corresponding to the type 2 uplink resource indicates a timing relationship between the second scheduling information and the uplink data.

14. The method according to claim 13, wherein the method further comprises:
sending, by the base station on the type 2 downlink resource according to a third timing relationship corresponding to the type 2 uplink resource, response feedback information to the terminal, wherein the third timing relationship indicates a timing relationship between the uplink data and the response feedback information.

15. The method according to claim 10, wherein:
the DCI or the RAR further comprises the first scheduling information.

16. A terminal, wherein the terminal comprises a processor, a memory, a system bus, and a communications interface, wherein
the memory is configured to store a computer executable instruction, the processor is connected to the memory by using the system bus, and when the terminal runs, the processor executes the computer executable instruction stored in the memory, so that the terminal executes the data transmission method according to claim 1.

17. A base station, wherein the base station comprises a processor, a memory, a system bus, and a communications interface, wherein
the memory is configured to store a computer executable instruction, the processor is connected to the memory by using the system bus, and when the base station runs, the processor executes the computer executable instruction stored in the memory, so that the terminal executes the data transmission method according to claim 8.

* * * * *